(12) United States Patent
Kim et al.

(10) Patent No.: US 8,699,512 B2
(45) Date of Patent: Apr. 15, 2014

(54) METHOD FOR ALLOCATING RESOURCE FOR MULTICAST AND BROADCAST SERVICE DATA IN WIRELESS COMMUNICATION SYSTEM AND AN APPARATUS THEREFOR

(75) Inventors: Jeong Ki Kim, Anyang-si (KR); Hee Jeong Cho, Anyang-si (KR); Yong Ho Kim, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 155 days.

(21) Appl. No.: 13/504,067

(22) PCT Filed: Dec. 6, 2010

(86) PCT No.: PCT/KR2010/008664
§ 371 (c)(1),
(2), (4) Date: Apr. 25, 2012

(87) PCT Pub. No.: WO2011/074814
PCT Pub. Date: Jun. 23, 2011

(65) Prior Publication Data
US 2012/0207073 A1      Aug. 16, 2012

Related U.S. Application Data

(60) Provisional application No. 61/286,778, filed on Dec. 15, 2009, provisional application No. 61/294,790, filed on Jan. 13, 2010.

(30) Foreign Application Priority Data

Apr. 12, 2010   (KR) .......................... 10-2010-0033171

(51) Int. Cl.
*H04L 12/66*       (2006.01)

(52) U.S. Cl.
USPC .......................................................... 370/463

(58) Field of Classification Search
USPC ................................................. 370/431–463
See application file for complete search history.

(56) References Cited

U.S. PATENT DOCUMENTS

| 8,271,627 | B2 * | 9/2012 | Cho et al. ...................... 709/221 |
| 8,289,893 | B2 * | 10/2012 | Kim et al. ...................... 370/312 |
| 8,310,987 | B2 * | 11/2012 | Cho et al. ...................... 370/328 |
| 8,509,149 | B2 * | 8/2013 | Cho et al. ...................... 370/328 |
| 2011/0007683 | A1 * | 1/2011 | Kim et al. ...................... 370/312 |

(Continued)

FOREIGN PATENT DOCUMENTS

| WO | WO 2009/110714 A1 | 9/2009 |
| WO | WO 2009/139605 A2 | 11/2009 |
| WO | WO 2009/148258 A2 | 12/2009 |

*Primary Examiner* — Fan Ng
(74) *Attorney, Agent, or Firm* — Birch, Stewart, Kolasch & Birch, LLP

(57) ABSTRACT

A method for receiving multicast and broadcast service (MBS) data from a base station to a mobile station comprises receiving a sub-packet from the base station in accordance with a predetermined period, the sub-packet including information associated with initial network entry and network discovery included in a secondary-super frame header (S-SFH); and receiving a first MBS MAP from the base station, the first MBS MAP including an S-SFH sub-packet update indicator indicating whether a parameter included in the sub-packet has been changed, wherein the S-SFH sub-packet update indicator indicates whether the changed sub-packet has been transmitted within an MBS scheduling interval (MSI) for which the first MBS MAP is transmitted.

16 Claims, 13 Drawing Sheets

(56) References Cited

U.S. PATENT DOCUMENTS

| | | | |
|---|---|---|---|
| 2011/0051649 A1* | 3/2011 | Josiam et al. | 370/312 |
| 2011/0051848 A1 | 3/2011 | Yuk et al. | |
| 2011/0058511 A1* | 3/2011 | Kim et al. | 370/312 |
| 2011/0059761 A1* | 3/2011 | Kim et al. | 455/509 |
| 2011/0075600 A1* | 3/2011 | Kim et al. | 370/312 |
| 2011/0110341 A1 | 5/2011 | Yuk et al. | |
| 2011/0149832 A1* | 6/2011 | Kim et al. | 370/312 |
| 2012/0020271 A1* | 1/2012 | Josiam et al. | 370/312 |
| 2012/0207073 A1* | 8/2012 | Kim et al. | 370/311 |
| 2013/0028165 A1* | 1/2013 | Kim et al. | 370/312 |
| 2013/0039255 A1* | 2/2013 | Kim et al. | 370/312 |
| 2013/0058280 A1* | 3/2013 | Kim et al. | 370/328 |

* cited by examiner

US 8,699,512 B2

METHOD FOR ALLOCATING RESOURCE FOR MULTICAST AND BROADCAST SERVICE DATA IN WIRELESS COMMUNICATION SYSTEM AND AN APPARATUS THEREFOR

CROSS REFERENCE TO RELATED APPLICATIONS

This application is the National Phase of PCT/KR2010/008664 filed on Dec. 6, 2010, which claims priority under 35 U.S.C. 119(e) to U.S. Provisional Application Nos. 61/286,778 and 61/294,790 filed on Dec. 15, 2009 and Jan. 13, 2010 respectively, and under 35 U.S.C. 119(a) to Patent Application No. 10-2010-0033171 filed in the Republic of Korea on Apr. 12, 2010, all of which are hereby expressly incorporated by reference into the present application.

TECHNICAL FIELD

The present invention relates to a wireless communication system, and more particularly, to a method for allocating resource for multicast and broadcast service data in a wireless communication system and an apparatus therefor.

BACKGROUND ART

FIG. 1 is a diagram illustrating a wireless communication system.

Referring to FIG. 1, a wireless communication system 100 includes a plurality of base stations 110 and a plurality of mobile stations 120. The wireless communication system 100 can include a homogeneous network or heterogeneous network. In this case, a network where different network entities coexit, such as a macro cell, a femto cell, a pico cell, and a relay station, is designated as the heterogeneous network.

The base stations are fixed stations that perform communication with a mobile station. Each of the base stations 110a, 110b, and 110c provides a service to specific local regions 102a, 102b, and 102c. In order to improve system throughput, the specific regions can be divided into a plurality of smaller regions 104a, 104b and 104c. Each of the smaller regions may be designated as a cell, sector or segment. In case of the IEEE 802.16 system, cell identity (Cell_ID or IDCell) is given based on the whole system.

On the other hand, sector or segment identity is given based on the specific region where each base station provides a service, and has a value of 0 to 2. The mobile stations 120 can generally be distributed, fixed or moved in the wireless communication system. Each mobile station can perform communication with one or more base stations through an uplink (UL) and a downlink (DL) at a random time. The base station and the mobile station can perform communication with each other by using FDMA (Frequency Division Multiple Access), TDMA (Time Division Multiple Access), CDMA (Code Division Multiple Access), SC-FDMA (Single Carrier-FDMA), MC-FDMA (Multi Carrier-FDMA), OFDMA (Orthogonal Frequency Division Multiple Access) or their combination. Herein, the uplink means a communication link from the mobile station to the base station while the downlink means a communication link from the base station to the mobile station.

DISCLOSURE OF INVENTION

Technical Problem

Accordingly, the present invention is directed to a method for allocating resource for multicast and broadcast service data in a wireless communication system and an apparatus therefor, which substantially obviate one or more problems due to limitations and disadvantages of the related art.

An object of the present invention is to provide a method for transmitting a signal to efficiently use multicast and broadcast service data in a wireless communication system and an apparatus therefor.

Another object of the present invention is to provide a method for using multicast and broadcast service data by successfully receiving a super frame header related to the multicast and broadcast service data at a mobile station.

Other object of the present invention is to provide a method for previously transmitting information indicating change of a super frame header, whereby a mobile station of a power saving mode can receive the changed super frame header by waking up at the time when the changed super frame header is transmitted.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method for receiving multicast and broadcast service (MBS) data from a base station to a mobile station comprises receiving a sub-packet from the base station in accordance with a predetermined period, the sub-packet including information associated with initial network entry and network discovery included in a secondary-super frame header (S-SFH); and receiving a first MBS MAP from the base station, the first MBS MAP including an S-SFH sub-packet update indicator indicating whether a parameter included in the sub-packet has been changed.

In this case, the S-SFH sub-packet update indicator indicates whether the changed sub-packet has been transmitted within an MBS scheduling interval (MSI) for which the first MBS MAP is transmitted.

If the S-SFH sub-packet update indicator indicates change of the sub-packet, the first MBS MAP includes a transmission time offset field indicating the time when the changed sub-packet is transmitted.

In this case, the transmission time offset field includes information of the number of superframes increased and decreased based on the time when the sub-packet prior to change in a radio frame structure is transmitted. Also, the number of bits of the transmission time offset field is determined depending on the MSI.

If the mobile station is in a power saving mode, the method further comprises receiving the changed sub-packet by waking up at the time when the changed sub-packet is transmitted in accordance with the transmission time offset information.

Also, the method further comprises obtaining an MBS resource zone based on information downlink frequency partition information included in the changed sub-packet; and receiving a second MBS MAP and MBS burst from the obtained MBS resource zone.

In this case, the downlink frequency partition information includes at least one of downlink subband allocation count (DSAC) information, downlink frequency partition configuration (DFPC) information, and downlink frequency partition subband count (DFPSC) information.

According to one embodiment of the present invention, the S-SFH includes a first S-SFH sub-packet, a second S-SFH sub-packet and a third S-SFH sub-packet, which are respectively transmitted with their independent transmission periods at different times, and the sub-packet, which includes the information associated with initial network entry and network discovery, is a packet associated with the MBS and corresponds to the second sub-packet.

In another aspect of the present invention, a method for transmitting multicast and broadcast service (MBS) data from a base station to a mobile station comprises transmitting a sub-packet to the mobile station in accordance with a predetermined period, the sub-packet including information associated with initial network entry and network discovery included in a secondary-super frame header (S-SFH); and transmitting a first MBS MAP to the mobile station, the first MBS MAP including an S-SFH sub-packet update indicator indicating whether a parameter included in the sub-packet has been changed, wherein the S-SFH sub-packet update indicator indicates whether the changed sub-packet has been transmitted within an MBS scheduling interval (MSI) for which the first MBS MAP is transmitted.

The method further comprises transmitting the changed sub-packet to the mobile station; and transmitting a second MBS MAP and MBS burst to the mobile station.

In still another aspect of the present invention, a mobile station for receiving multicast and broadcast service (MBS) data comprises a receiving module for receiving a radio signal; and a processor for controlling an operation of the mobile station, wherein the receiving module receives a first MBS MAP from a base station in accordance with a predetermined period, the first MBS MAP including a sub-packet and an S-SFH sub-packet update indicator, the sub-packet including information associated with initial network entry and network discovery included in a secondary-super frame header (S-SFH), and the S-SFH sub-packet update indicator indicating whether a parameter included in the sub-packet has been changed, and the processor controls the mobile station of a power saving mode so that the mobile station wakes up at the time when the changed sub-packet is transmitted in accordance with the S-SFH sub-packet update indicator and receives the changed sub-packet.

In further still another aspect of the present invention, a base station for transmitting multicast and broadcast service (MBS) data comprises a transmitting module for transmitting a radio signal; and a processor generating a sub-packet, which includes information associated with initial network entry and network discovery included in a secondary-super frame header (S-SFH) to transmit the sub-packet to a mobile station through the transmitting module in accordance with a predetermined period, and generating an MBS MAP, which includes an S-SFH sub-packet update indicator indicating whether a parameter included in the sub-packet has been changed, to transmit the MBS MAP to the mobile station through the transmitting module, wherein the S-SFH sub-packet update indicator indicates whether the changed sub-packet has been transmitted within an MBS scheduling interval (MSI) for which the MBS MAP is transmitted.

Here, the power saving mode may include a sleep mode and an idle mode.

It is to be understood that the aforementioned embodiments are only exemplary and explanatory, and various embodiments including technical features of the present invention can be devised by those skilled in the art based on the detailed description of the present invention, which will be described later.

Advantageous Effects of Invention

According to the embodiments of the present invention, multicast and broadcast services can be used efficiently in the wireless communication system.

In detail, the mobile station can use multicast and broadcast services by successfully receiving the super frame header related to the multicast and broadcast services.

In addition, the mobile station of a sleep mode can use multicast and broadcast services by waking up at the time when a changed super frame header is transmitted through information indicating change of the super frame header and successfully receiving the changed super frame header.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to a system that uses a plurality of orthogonal subcarriers. For convenience, the present invention will be described based on the IEE 802.16 system. However, the IEEE 802.16 system is only exemplary, and the present invention can be applied to various wireless communication systems including a 3rd generation partnership project (3GPP) system.

Figure 1:
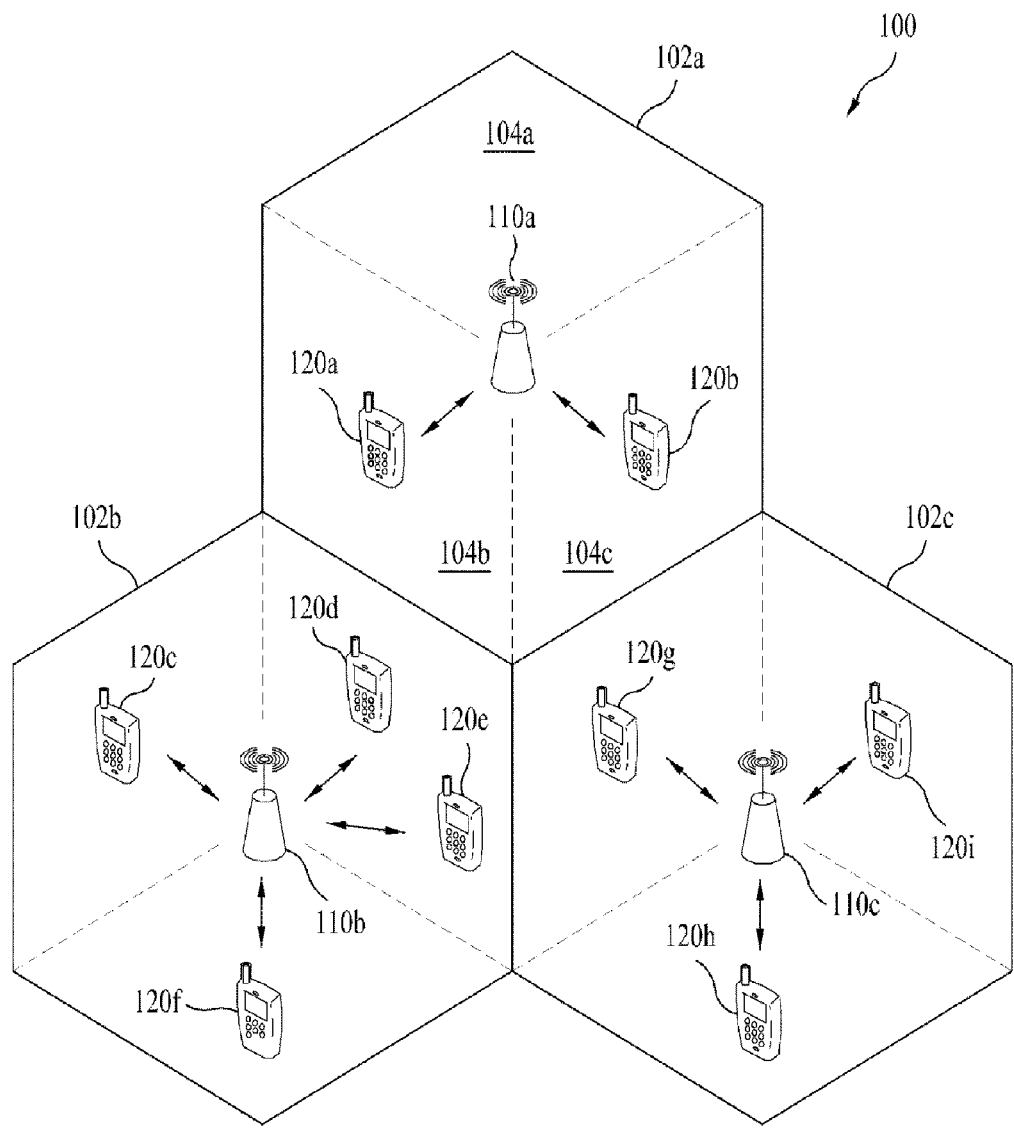
FIG. 1 is a diagram illustrating a wireless communication system.
Figure 2:
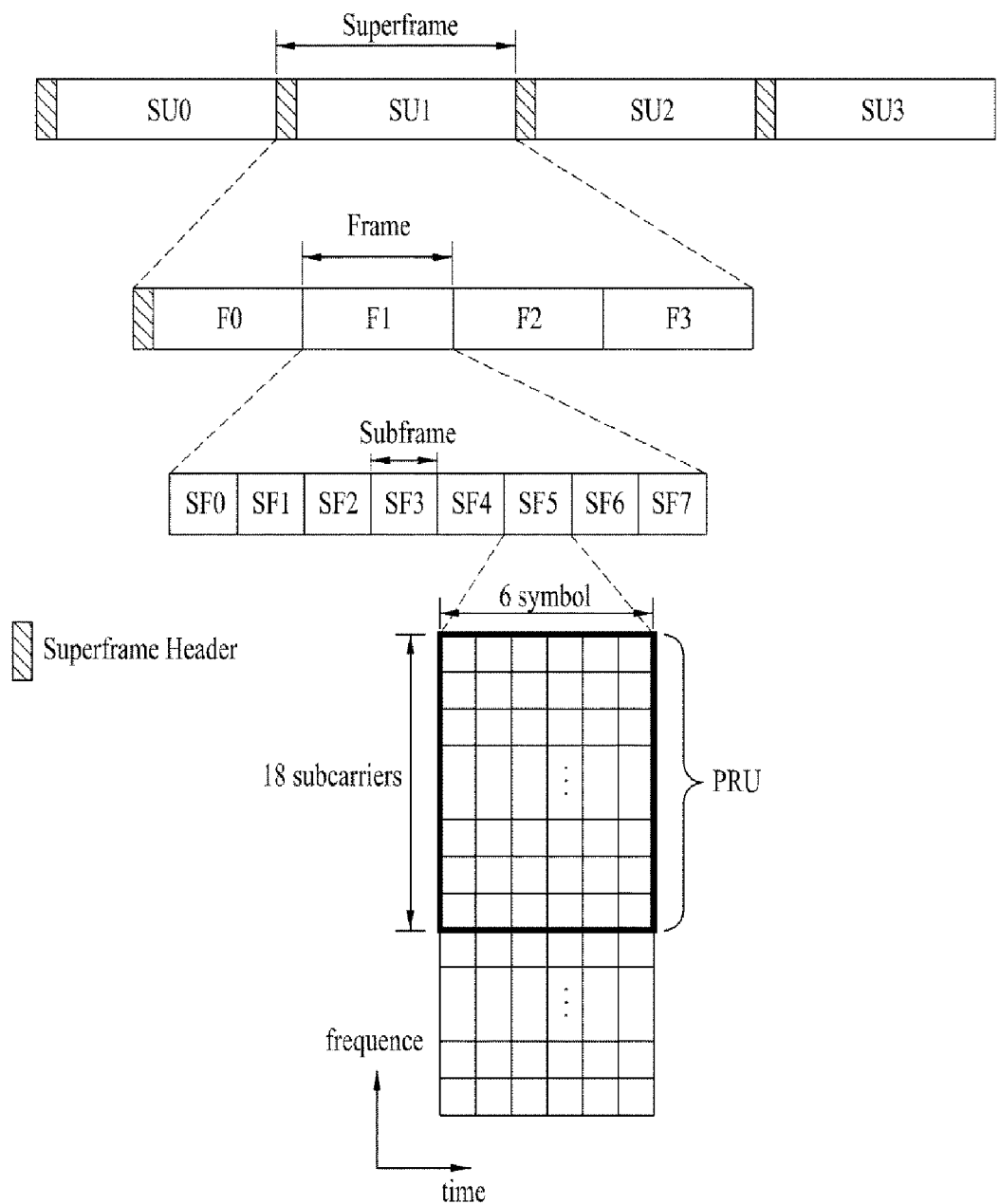
FIG. 2 is a diagram illustrating an example of a frame structure generally used in an IEEE 802.16m system.
Figure 3:
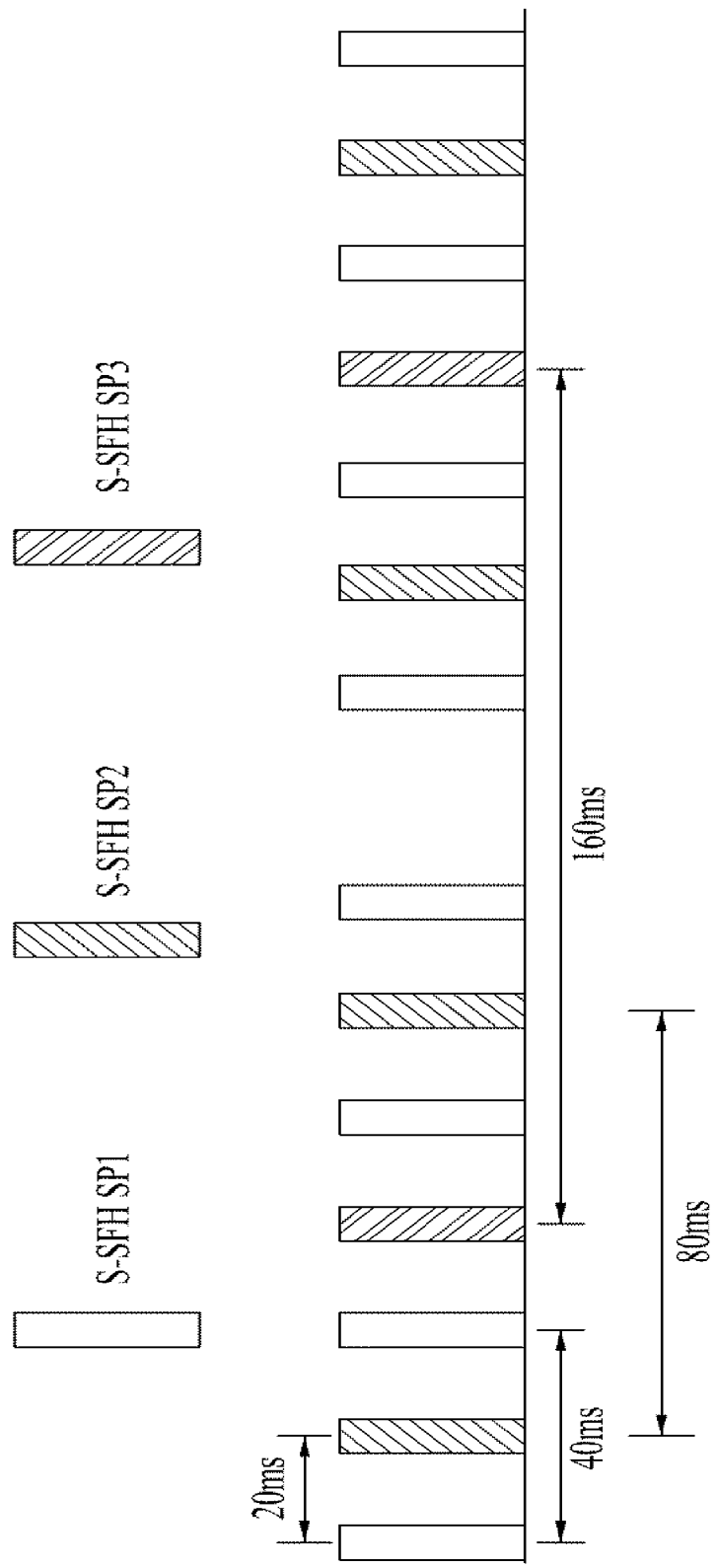
FIG. 3 is a diagram illustrating a structure of a superframe subject to a duplex mode generally used in an IEEE 802.16m system.

FIG. 2 is a diagram illustrating an example of a frame structure generally used in an IEEE 802.16m system, and FIG. 3 is a diagram illustrating a structure of a superframe subject to a duplex mode generally used in an IEEE 802.16m system.

Referring to FIG. 2, the radio frame includes superframes SU0 to SU3 of 20 ms that support a bandwidths of 5 MHz, 8.75 MHz, 10 MHz or 20 MHz. Each superframe includes four frames F0 to F3 of 5 ms having the same size, and starts with a super frame header (SFH).

The super frame header can be located within the first subframe as illustrated in FIG. 2, and uses at least five OFDM symbols. The super frame header is used to efficiently transmit essential system parameter and system configuration information to mobile stations, wherein the essential system parameter is essential for network entry. Also, the super frame header can include a physical broadcast channel through which general broadcast information or advanced broadcast information (ABI) is broadcasted.

The super frame header includes one primary super frame header (P-SFH) and three secondary super frame headers (S-SFH). The P-SFH is transmitted per superframe, and the S-SFH can be transmitted per superframe. The S-SFH can be transmitted repeatedly through two continuous superframes. The S-SFH will be described in brief with reference to FIG. 4.

Each frame constituting the suerframes includes eight subframes SF0 to SF7. The frame structure can include a Frequency Division Duplex (FDD) mode, a Half Frequency Division Duplex (H-FDD) mode, a Time Division Duplex (TDD) mode, etc.

Referring to FIG. 3, since downlink transmission and uplink transmission are identified by frequency in the FDD mode, the frame includes either a downlink subframe (D) or an uplink subframe (U). In case of the FDD mode, an idle time can exist at the end of each frame. On the other hand, since downlink transmission and uplink transmission are identified by time in the TDD mode, the subframe within the frame is divided into a downlink subframe (D) or an uplink subframe (U). An idle time referred to as a transmit transition gap (TTG) exists when a downlink is changed to an uplink while an idle time referred to as a receive transition gap (RTG) exists when an uplink is changed to a downlink.

Referring to FIG. 2 again, each subframe includes a plurality of OFDM symbols in a time domain and a plurality of subcarriers in a frequency domain. The OFDM symbols may be referred to as OFDMA symbols or SC-FDMA symbols depending on a multiplexing access mode. The number of OFDM symbols included in one subframe can be varied within the range of 5-7 depending on channel bandwidth and cyclic prefix (CP) length. A type of the subframe can be defined depending on the number of OFDM symbols included in the subframe. For example, the type of the subframe can be defined in such a manner that subframe type-1 includes six OFDM symbols, subframe type-2 includes seven OFDM symbols, subframe type-3 includes five OFDM symbols, and subframe type-4 includes nine OFDM symbols. One frame may include the same type subframes or different types of subframes.

Figure 4:
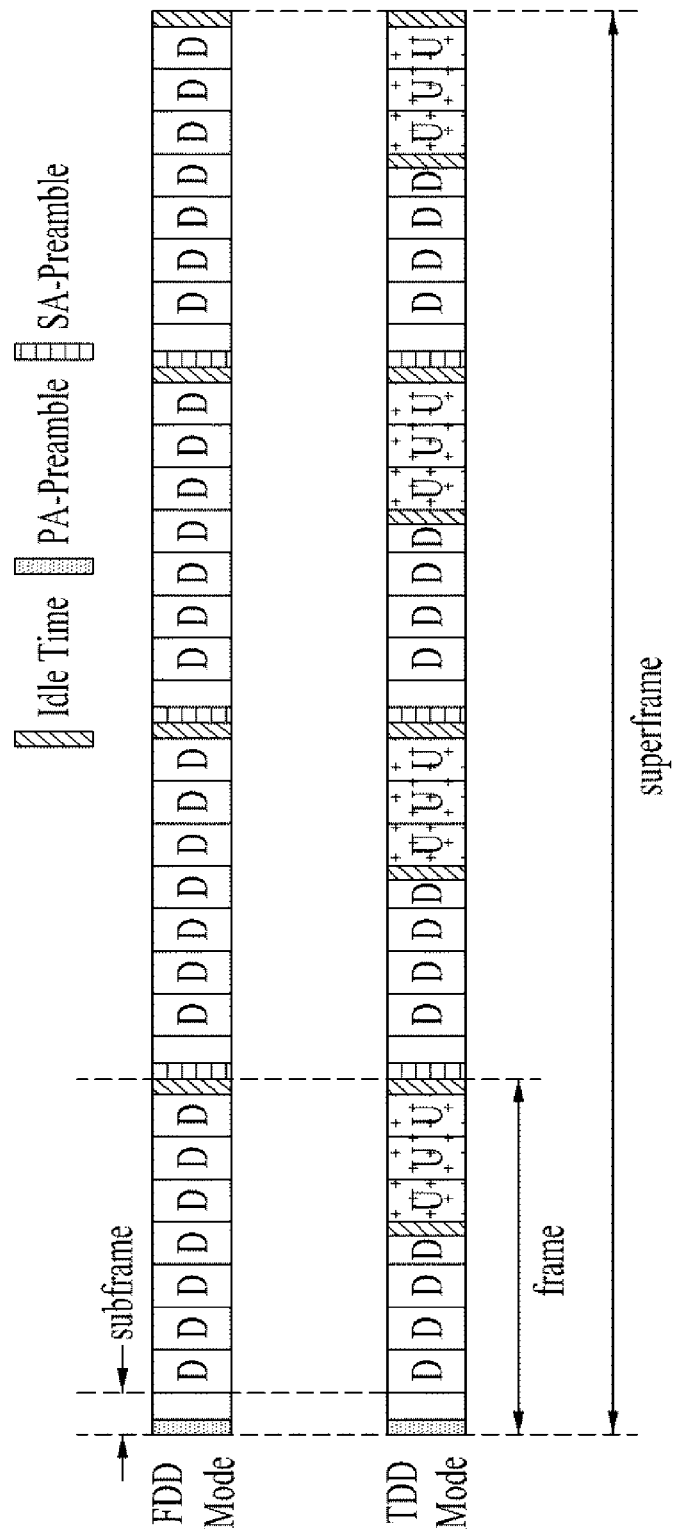
FIG. 4 is a diagram illustrating an example of a transmission structure of a secondary superframe header generally used in an IEEE 802.16m system.

FIG. 4 is a diagram illustrating an example of a transmission structure of a secondary superframe header generally used in an IEEE 802.16m system.

Information transmitted through the S-SFH can be divided into two sub packets (SP). The respective SP corresponding to the S-SFH can be referred to as S-SFH SP1, S-SFH SP2, and S-SFH SP3.

Referring to FIG. 4, the respective S-SFH can be set at different transmission periods. For example, the respective S-SFH can be set independently in such a manner that S-SFH SP1 has a transmission period of 40 ms, S-SFH SP2 has a transmission period of 80 ms, and S-SFH SP3 has a transmission period of 160 ms or 320 ms. The S-SFH SP1 includes network reentry information, the S-SFH SP2 includes information of initial network entry and network discovery, and the S-SFH SP3 includes essential system information such as transmission periods of the respective S-SFH SP. At this time, a superframe resource of a region, to which the S-SFH SP is not transmitted, on the super frame is used to transmit other control information or A-MAP.

The aforementioned structure described with reference to FIG. 2 to FIG. 4 is only exemplary. Accordingly, the length of the superframe, the number of frames included in the superframe, the number of subframes included in the frame, the number of OFDMA symbols included in the subframe, and OFDMA symbol parameter can be varied in various manners. For example, the number of subframes included in the frame can be varied in various manners depending on channel bandwidth and CP length.

The IEEE 802.16m system supports an enhanced multicast and broadcast service (E-MBS) to efficiently transmit downlink data common to a user group at the same time, wherein the user group includes one or more users. The E-MBS can be used as the MBS within the range that does not depart from technical spirits of the present invention.

The E-MBS can be used for downlink service only, and uses common multicast station ID (STID) and flow ID (FID). Also, the E-MBS can be coordinated or synchronized by any one base station of a base station group that includes one or more base stations that use macro-diversity.

Each multicast/broadcast connection is associated with a service flow having quality of service (QoS) and traffic parameter. In order to transmit E-MBS data, the service flow is transferred to each mobile station that takes part in a corresponding service during a normal mode or connected state. As a result, each mobile station can receive a parameter that identifies a service flow associated with the corresponding service.

Each base station that can provide the E-MBS belongs to a specific E-MBS zone. One base station can belong to a plurality of E-MBS zones. In this case, the E-MBS zone can be defined as a base station set that includes one or more base stations having the same STID and FID used to transmit contents of one or more service flows. Each E-MBS zone has E-MBS identifier (E-MBS_Zone_ID) that can be identified from another E-MBS zone. One E-MBS_Zone_ID is not reused in a way to cross between two neighboring E-MBS zones.

In order to ensure a proper multicast operation on a network of a base station that uses E-MBS, the same STID and FID used for the same E-MBS contents and service transmission can be used for all base stations included in the corresponding E-MBS zone. This allows the mobile station already registered with a corresponding service to perform communication on an uplink within the E-MBS zone or to synchronize with E-MBS transmission without re-registration with other base station that belongs to the corresponding E-MBS zone.

The E-MBS traffic transmission mode can be divided into a non-macro diversity mode and a macro diversity mode.

The non-macro diversity mode is to coordinate base stations belonging to the same E-MBS zone in such a manner that the base stations perform transmission at the same frame. The non-macro diversity mode is used when the macro diversity mode cannot be used. In the corresponding mode, all base stations belonging to the same E-MBS zone transmit a MAC SDU set that carries the same E-MBS contents at the same frame. At this time, the MAC SDU set is mapped with a MAC PDU at the same frame. This means that mapping is performed at the same SDU fragment, the same fragment sequence number, and the same fragment size. In this case, the mobile station can receive the E-MBS from all base stations belonging to the same E-MBS zone.

The macro diversity mode means that all base stations belonging to one E-MBS zone selectively synchronize E-MBS transmission as well as coordinate E-MBS transmission. This selective synchronization could lead to macro diversity gain when one mobile station performs multicast or broadcast transmission from a plurality of base stations, thereby improving a receiving rate.

In the macro diversity mode, all base stations belonging to one E-MBS zone and taking part in the same E-MBS service transmit the same data by using the same resource at the same time, thereby bringing macro diversity effect through E-MBS transmission.

In more detail, all base stations belonging to one E-MBS zone use E-MBS burst of the same position and dimension as well as PHY parameter. Moreover, all base stations of the E-MBS zone shares the same information in respect of coordinating parameters (for example, E-MBS_Zone_ID, STID, FID, MSI (E-MBS scheduling interval), etc.) and packet classification rule parameter. Also, all base stations of the E-MBS zone shares the same information in respect of transmission PHY parameter, modulation and coding scheme (MCS) of each E-MBS burst, modulation type, repetition coding, mapping of MAC SDU with MAC PDU, mapping of MAC PDU with burst, burst order in the E-MBS zone, and E-MBS MAP mode.

All base stations of the E-MBS zone can transmit E-MBS MAP, which includes essential configuration information required to support the E-MBS, to the mobile station at a predetermined period. In this case, in order that the mobile station reads and decodes the E-MBS MAP transmitted from the base stations, E-MBS connection should be established between each base station and the mobile station. To this end, the mobile station that intends to use the E-MBS and any one of the base stations belonging to the E-MBS zone can transmit and receive a MAC control message for E-MBS connection to and from each other. Examples of the MAC control message related to E-MBS connection include AAI_REG-REQ/RSP (Advanced Air Interface_Registration-Request/Response) message associated with registration of a mobile station with a base station, AAI_DSA-REQ/RSP (Advanced Air Interface_Dynamic Service Addition-Request/Response) message, AAI_DSC-REQ/RSP (Advanced Air Interface_Dynamic Service Change-Request/Response) message, and AAI_DSD-REQ/RSP (Advanced Air Interface_Dynamic Service Deletion-Request/Response), wherein the AAI_DSA-REQ/RSP message, the AAI_DSC-REQ/RSP message, and the AAI_DSD-REQ/RSP message are associated with addition, change, and deletion of a service flow.

As described above, if E-MBS connection between the mobile station and any one base station belonging to the E-MBS zone is performed, the E-MBS can continue to receive the E-MBS from the random base station belonging to the corresponding E-MBS zone regardless of the action mode of the mobile station.

According to the embodiment of the present invention, the mobile station can be operated in a connected state, a sleep mode or an idle mode.

The connected state can be used to mean a normal mode or an active mode, and means a power supply state such that the mobile station normally performs transmission and reception operations. The sleep mode can be used to mean a power saving mode. If the mobile station enters the sleep mode, since the base station cannot transmit downlink data to the mobile station during its sleep window, the mobile station may not perform one or more physical operations, whereby the consumed power can be reduced. Also, in the sleep mode, the mobile station can be operated for the essential function only such as an operation that does not require communication with the base station, whereby the consumed power can be reduced.

The idle mode means that the mobile station can temporarily perform a normal operation such as signal reception in accordance with its paging cycle. The idle mode can reduce power consumption as compared with the active mode. Even in the idle mode, the mobile station can receive a signal by searching for a paging channel and temporarily waking up if there is a paging channel corresponding to the mobile station. If there is no paging channel corresponding to the mobile station, the mobile station can enter the idle mode again. Accordingly, the base station that intends to transmit data or request information to the mobile station of the idle mode can transmit a signal for a paging interval of the mobile station. If the E-MBS is supported for the mobile station of the power saving mode (e.g., idle mode or the sleep mode), the mobile station of the power saving mode should temporarily wake up at the time when the E-MBS data are transmitted. Hereinafter, an example of a signal transmission procedure will be described with reference to FIG. 5.

Figure 5:
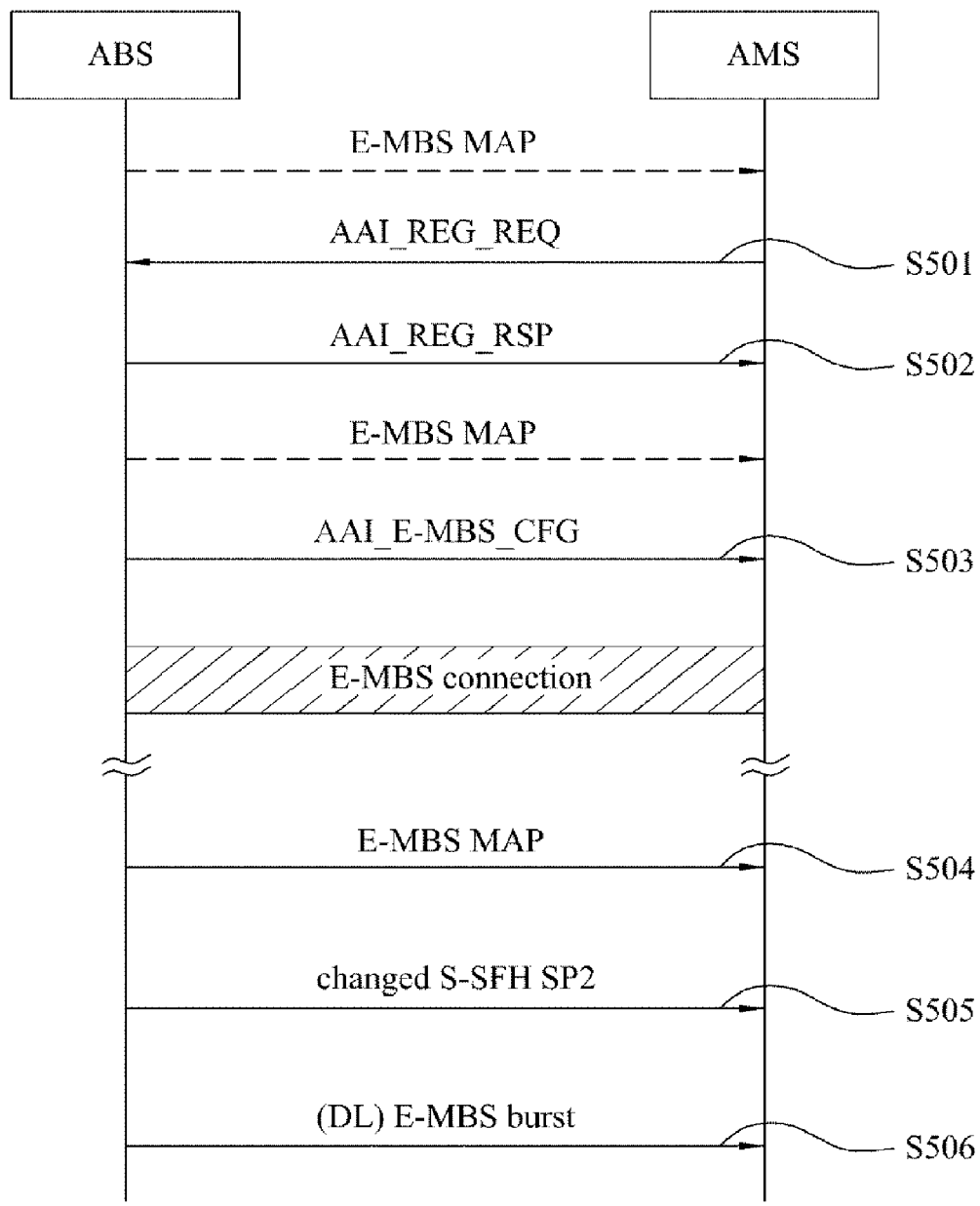
FIG. 5 is a flow chart illustrating an example of a procedure of transmitting a signal using E-MBS at a base station and a mobile station in an IEEE 802.16m system.

FIG. 5 is a flow chart illustrating an example of a procedure of transmitting a signal using E-MBS at a base station and a mobile station in an IEEE 802.16m system.

Referring to FIG. 5, in order to use the E-MBS, the mobile station transmits AAI_REG-REQ for network entry to any one of a plurality of base stations that support E-MBS transmission (S501).

At this time, it is assumed that the mobile station is operated in a connected state or an active mode. The AAI_REG-REQ includes information indicating whether the E-MBS is supported for the corresponding mobile station or indicating whether the corresponding mobile station can receive the E-MBS from a single base station or multiple base stations if the E-MBS is supported.

The corresponding base station that has received the AAI_REG-REQ transmits AAI_REG-RSP to the corresponding mobile station in response to the AAI_REG-REQ (S502).

The base station can indicate through the AAI_REG-RSP whether it can support the E-MBS requested from the mobile station and which mode of the non-macro diversity mode and the macro diversity mode will be used to support the E-MBS if the base station supports the E-MBS.

Afterwards, for continuous E-MBS operation, the base station transmits AAI_E-MBS-CFG MAC control message (Advanced Air Interface_Enhanced-Multicast and Broadcast Service-Configuration MAC Control message, hereinafter, referred to as 'AAI_E-MBS-CFG message) to the mobile station (S503).

The AAI_E-MBS-CFG message is transmitted in accordance with a predetermined period, specifies a resource reserved for E-MBS traffic from downlink physical resources, and includes additional information essential for the E-MBS operation.

Table 1 illustrates an example of an AAI_E-MBS-CFG message format that includes system information associated with the E-MBS.

field that includes E-MBS Zone ID of the E-MBS zone to which the corresponding E-MBS MAP is applied, an MSI length field that includes length information (MSI length) of MSI comprised of one or more superframes, an E-MBS map resource index field that includes E-MBS MAP resource index, the E-MBS MAP including location information where the resource is allocated and resource size information, and an E-MBS MAP size offset field (E-MBS MAP Isizeoffset) that includes size offset information of the E-MBS MAP. The AAI_E-MBS-CFG message is transmitted per MAX MSI (16 superframes=320 ms), and MSI starts from next superframe where the AAI_E-MBS-CFG message is transmitted. The MSI is represented by a plurality of superframes that can perform scheduling for traffic of streams associated with the MBS zone, at once.

Accordingly, the mobile station can acquire allocation information (Zone_Allocation Bit-MAP, ZF, E-MBS_Zone_ID) of the E-MBS zone and information (MSI, E-MBS MAP resource Index, E-MBS MAP Isizeoffset) associated with E-MBS MAP decoding through the AAI_E-MBS-CFG message. This E-MBS connection of a specific mobile station in respect of a service flow can be performed while the specific mobile station is being in the connected state.

If the mobile station has been registered with the base station to use the E-MBS, the E-MBS can be maintained even

TABLE 1

| Syntax | Size(bits) | Notes |
|---|---|---|
| AAI_E-MBS_CFG_Message_Format( ){ | | |
| MAC Control Message Type | 8 | AAI_E-MBS_CFG |
| E-MBS_CFG_LIFETIME(m) | 4 | Indicates the duration of E-MBS_CFG_LIFETIME for which the E-MBS configuration information of the zone do not change. Duration of E-MBS_CFG_LIFETIME: 16(m + 1) superframes |
| Zone_Allocation Bit-MAP | variable | Indicates the zone configuration. The size is as below. 20 bits for 20 MHz 9 bits for 10 MHz 3 bits for 5 MHz |
| ZF(Zone Flag) | 1 | Zone Flag Bit. Indicates the use of the last zone. 0b0: Unicast0b1: E-MBS |
| for (i = 0; i< Num_E-MBS_Zones; i++) { | | |
| E-MBS_Zone_ID | 7 | The EMBS_Zone_ID to which this EMBS MAP applies. |
| MSI Length (NMSI) | 2 | The length of an MSI in units of the number of superframes0b00: 2 superframe, 40 ms (NMSI = 2)0b01: 4 superframe, 80 ms (NMSI = 4)0b10: 8 superframe, 160 ms (NMSI = 8)0b11: 16 superframe, 320 ms (NMSI = 16) |
| E-MBS MAP Resource Index | 11 | Resource index includes location and allocation size. |
| E-MBS MAP ISizeOffset | 5 | |
| } } | | |

Referring to Table 1, the AAI_E-MBS-CFG message includes a change period field (E-MBS_CFG_LIFETIME) indicating a change period of configuration information included in the corresponding message, a resource allocation bitmap field (Zone_Allocation Bit-MAP) indicating resource information allocated to the E-MBS zone, and a zone flag field (ZF) that includes a flag indicating whether the last E-MBS zone is used.

At this time, if the base station that transmits the AAI_E-MBS-CFG message supports the E-MBS, AAI_E-MBS-CFG message format can further include an E-MBS zone identifier in the case that the mobile station corresponds to any one of the active mode, the sleep mode and the idle mode.

After E-MBS connection, the mobile station can read the E-MBS MAP transmitted from the base station at a predetermined period (S504). At this time, the mobile station receives the E-MBS MAP from a random base station of the E-MBS zone through first several resource units of the E-MBS zone at a point where the E-MBS starts. The E-MBS MAP includes control information associated with multicast and broadcast services for the corresponding E-MBS zone. The E-MBS MAP is control information broadcasted by the base station, which supports the E-MBS, in accordance with a predetermined period. The mobile station that intends to use the E-MBS can receive the E-MBS MAP after E-MBS connection is performed in the aforementioned steps S501 to S503. Accordingly, a dotted line indicating a process of transmitting the E-MBS MAP in FIG. 5 represents that the base station transmits the E-MBS MAP at a predetermined period but the mobile station fails to receive it as E-MBS connection is not yet performed.

The mobile station can receive E-MBS burst through the E-MBS MAP (S505).

Table 2 illustrates an example of an E-MBS MAP structure used in a general IEEE 802.16 system.

TABLE 2

| Syntax | Size(bits) | Notes |
|---|---|---|
| E-MBS-MAP( ){ | — | — |
| E-MBS-DATA _IE( ) | — | — |
| } | | |
| Psdding | variable | Padding to reach byte boundary |

The E-MBS MAP includes one or more kinds of configuration information associated with multicast and broadcast services for the E-MBS zone. The E-MBS MAP is specified through the AAI_E-MBS-CFG message transmitted in a previous step, and is transmitted through first several resource units of the E-MBS zone where MSI starts.

Hereinafter, the S-SFH that includes information required to receive the E-MBS MAP will be described in brief with reference to FIG. 6.

Figure 6:
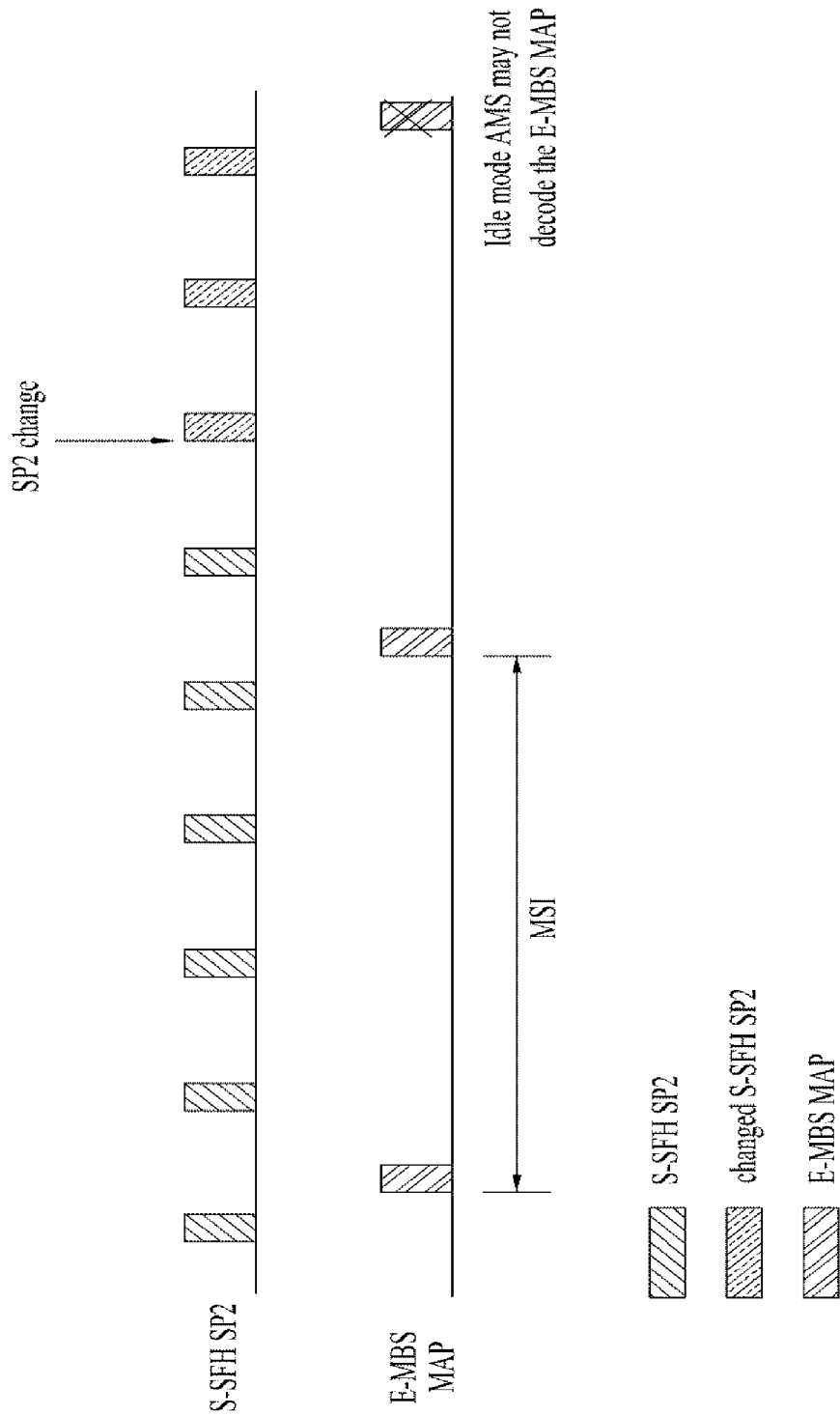
FIG. 6 is a diagram illustrating an example of a frame structure for transmitting E-MBS MAP from a base station to a mobile station of an idle mode in an IEEE 802.16m system that uses general E-MBS.

FIG. 6 is a diagram illustrating an example of a frame structure for transmitting E-MBS MAP from a base station to a mobile station of an idle mode in an IEEE 802.16m system that uses general E-MBS.

Referring to FIG. 6, the S-SFH SP2 is transmitted on each superframe at a predetermined transmission period, and the E-MBS MAP is transmitted from the first E-MBS zone of each E-MBS scheduling interval (MSI). Each E-MBS zone has a corresponding MSI, which represents a superframe interval where traffic of streams, which are associated with the MBS zone prior to the zone where the corresponding scheduling interval starts, is scheduled. The E-MBS_MAP message includes information of mapping of E-MBS data associated with one E-MBS zone for the whole MSI, and each S-SFH SP2 includes information of initial network entry and network discovery.

Table 3 illustrates an example of S-SFH SP2 information element (IE) in accordance with one embodiment of the present invention.

TABLE 3

| Syntax | Size(bits) | Notes |
|---|---|---|
| S-SFH SP2 IE Format( ){ | | |
| If(Duplexing mode=FDD) | | The duplexing mode us obtained from the grame configuration index set in S-SFH SP1 IE |
| UL carrier frequency | 6 | |
| UL bandwidth | 3 | The frequency spacing for UL channel is same with DL channel. 0b000: 512 FFT0b001: 1024 FFT0b010: 2048 FFT0b011 to 0b111: Reserved |
| } | | |
| MSB bits of 48bit ABS MAC ID | 36 | Specified 36 MSB of BS ID |
| MAC protocol reversion | 4 | Version number of AAI supported in this channel |
| DSAC | 5/4/3 | DL Frequency partitioningFor 2048 FFT size, 5bitsFor 1024 FFT size, 4bitsFor 512 FFT size, 3bits |
| DFPC | 4/3/3 | DL Frequency partitioningFor 2048 FFT size, 4bitsFor 1024 FFT size, 4bitsFor 512 FFT size, 3bits |
| DFPSC | 3/2/1 | DL Frequency partitioningFor 2048 FFT size, 3bitsFor 1024 FFT size, 2bitsFor 512 FFT size, 1bits |
| USAC | 5/4/3 | UL Frequency partitioningFor 2048 FFT size, 5bitsFor 1024 FFT size, 4bitsFor 512 FFT size, 3bits |
| UFPC | 4/3/3 | UL Frequency partitioningFor 2048 FFT size, 4bitsFor 1024 FFT size, 3bitsFor 512 FFT size, 3bits |
| UFPSC | 3/2/1 | UL Frequency partitioningFor 2048 FFT size, 3bitsFor 1024 FFT size, 2bitsFor 512 FFT size, 1bits |
| AMS Transmit Power Limitation Level | 5 | Specifies the maximun allowed AMS transmit power. |
| EIRxPIR,min reserved | 5 | |
| } | | |

Referring to Table 3, the S-SFH SP2 IE can include information of 36 bits corresponding to the most significant bits of corresponding BS ID comprised of 48 bits, subband allocation information and frequency partition information at a downlink, subband allocation information and frequency partition information at an uplink, and transmission power limitation level information of a mobile station.

The subband allocation information and the frequency partition information at a downlink include downlink subband allocation count (DSAC) information indicated the number of subband, downlink frequency partition configuration (DFPC) information, and downlink frequency partition subband count (DFPSC) information indicated the number of subbands allocated to frequency partition (FPi(i>0)).

The subband allocation information and the frequency partition information at an uplink include Uplink Subband Allocation Count (USAC) information indicated the number of subband, Uplink Frequency Partition Configuration (UFPC) information, and Uplink Frequency Partition Subband Count (UFPSC) information indicated the number of subbands allocated to frequency partition (FPi(i>0)).

The mobile station obtains the number of all subbands based on the subband allocation information and the frequency partition information (DSAC, DFPC and DFPSC) at a downlink, which is included in the received S-SFH SP2, and determines an actual E-MBS resource zone. As a result, the mobile station can discover next E-MBS MAP and receive E-MBS burst by decoding the corresponding E-MBS MAP. Accordingly, the mobile station that uses the E-MBS can receive the E-MBS MAP and the E-MBS burst even in the idle mode by waking up at the time when the E-MBS MAP and the E-MBS burst are transmitted.

Information of transmission periods of S-SFH SP1 and S-SFH SP3 including the aforementioned S-SFH SP2 is included in the S-SFH SP3. Accordingly, the mobile station can acquire change status information of location to which the S-SFH SP1 and the S-SFH SP2 are transmitted, after receiving the S-SFH SP3.

In this respect, if the S-SFH SP2 is changed as illustrated in FIG. 6, the mobile station of the idle mode, which receives the E-MBS, fails to receive the changed S-SFH SP2 at the time when the E-MBS MAP is received, and if the changed S-SFH SP2 is applied at the corresponding time, the mobile station may fail to decode the E-MBS MAP. For example, if the number of all subbands is changed, a physical location to which the E-MBS MAP is transmitted may be changed, and the mobile station may fail to receive the E-MBS burst for the MSI. In other words, the mobile station should receive SP to which the changed details is applied at least one time, so as to identify what time the SP is transmitted. For this reason, a problem occurs in that service continuity of the E-MBS is not maintained.

In order to solve the problem, the present invention is intended to suggest a method for previously transmitting information of changed S-SFH SP2 to a mobile station that receives E-MBS if a base station included in an E-MBS zone intends to change S-SFH SP2. In this case, the mobile station may be in the connected state or idle mode. However, for convenience of description, it is assumed that the mobile station is in the idle mode in accordance with the embodiments of the present invention and corresponding drawings after E-MBS connection with one base station of the E-MBS zone is performed.

1. First Embodiment

According to one embodiment of the present invention, the base station can transmit E-MBS MAP, which includes an indicator indicating whether S-SFH SP2 is changed, to the mobile station.

Figure 7:
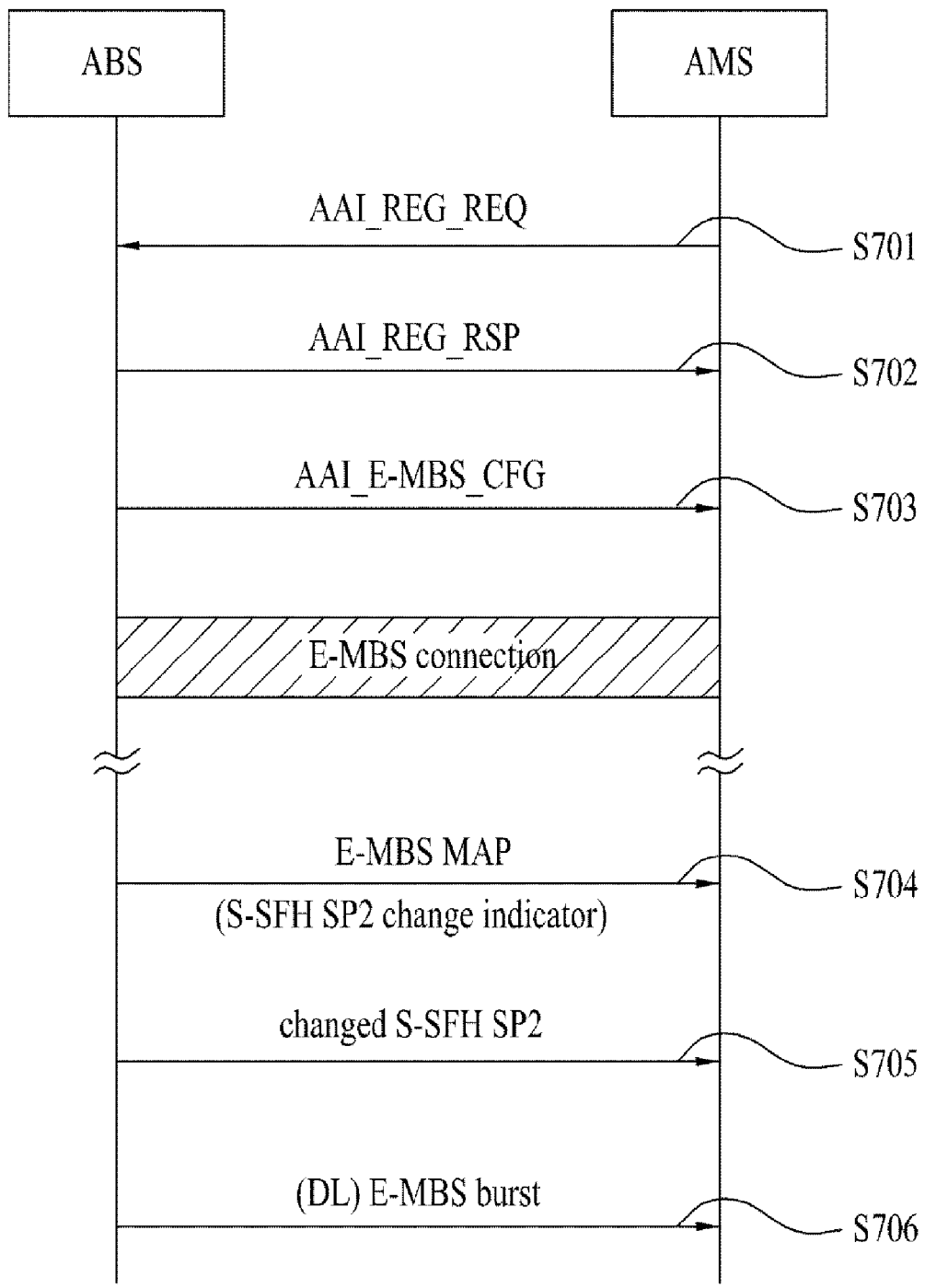
FIG. 7 is a diagram illustrating an example of a procedure of providing E-MBS from a base station, which uses the E-MBS, to a mobile station in accordance with one embodiment of the present invention.

FIG. 7 is a diagram illustrating an example of a procedure of providing E-MBS from a base station, which uses the E-MBS, to a mobile station in accordance with one embodiment of the present invention.

In FIG. 7, the base station, which corresponds to a random one included in the E-MBS zone, can support the E-MBS in accordance with a request of the mobile station. Also, it is assumed that the steps S501 to S503 for E-MBS establishment described in FIG. 5 are performed. In FIG. 7, steps S701 to S703 for E-MBS establishment correspond to the steps S501 to S503 illustrated in FIG. 5 and their description will be omitted for conciseness of the specification.

Referring to FIG. 7, the base station transmits E-MBS MAP to the mobile station at a predetermined period if the S-SFH SP2 is changed, wherein the E-MBS MAP includes an indicator indicating whether the S-SFH SP2 is changed (S704).

In other words, the base station can transfer information, which indicates that one or more S-SFH SP2 parameters to be transmitted before next E-MBS MAP is transmitted will be changed, to the mobile station through the E-MBS MAP transmitted in step S704. At this time, the E-MBS MAP is transmitted in accordance with a predetermined period regardless of E-MBS connection between the base station and the mobile station as described in FIG. 5. However, the mobile station can receive the E-MBS MAP in step S704 after E-MBS connection.

Table 4 illustrates an example of an E-MBS MAP structure according to one embodiment of the present invention.

TABLE 4

| Syntax | Size(bits) | Notes |
|---|---|---|
| E-MBS-MAP( ){ | | |
| AAI_E-MBS_CFG change Indication | 1 | AAI_E-MBS-CFG Change Indication indicates any change in the parameters of AAI_E-MBS-CFG MAC Control Message at its next transmission instance. |
| S-SFH SP2 update indicator | 1 | Indicates whether the changed S-SFH SP2 will be transmitted in this MSI. |
| If(S-SFH SP2 update indicator ==1){ | | |
| S-SFH SP2 transmission time offset | variable | Indicates the superframe offset which the changed S-SFH SP2 is transmitted. The size of this field depends on MSI. MSI == 0b00: 1 bits; MSI == 0b01: 2 bits; MSI == 0b10: 3 bits; MSI == 0b11: 4 bits. |
| } | | |
| E-MBS_DATA_IE( ) | — | — |
| Padding | variable | Padding to reach byte boundary |
| } | | |

Referring to Table 4, the E-MBS MAP includes a parameter change indication field (AAI_E-MBS_CFG change Indication) indicating any change in the parameters of the AAI_E-MBS-CFG message at its next transmission instance, an S-SFH SP2 update indicator field that includes an indicator indicating whether the changed S-SFH SP2 will be transmitted in the corresponding MSI, an S-SFH SP2 transmission time offset field that includes superframe offset information for indicating the time when the changed SP2 is transmitted, and a padding field that includes a padding bit to reach byte boundary.

When 1 bit is allocated to the parameter change indication field (AAI_E-MBS_CFG change Indication) of the AAI_E-MBS-CFG message, if '1' is set to that field, it indicates change of the parameters included in the E-MBS configuration message, and if '0' is set to that field, it indicates non-change of the parameters. If '1' is set to the parameter change indication field, the mobile station will decode the AAI_E-MBS-CFG message for next transmission. If '0' is set to the parameter change indication field, the E-MBS configuration message is not changed, and the mobile station resets a change period defined in the previously received AAI_E-MBS-CFG message and may not decodes the AAI-E-MBS-CFG message for next transmission.

If 1 bit is allocated to the S-SFH SP2 update indicator field, for example, if '1' is set to that field, it indicates any change in the S-SFH SP, and if '0' is set to that field, it indicates non-change in the S-SFH SP2. Accordingly, if parameters are changed in one or more S-SFH SP2 transmitted within next MSI before transmission of next E-MBS MAP, the base station can set the S-SFH SP2 change indicator to '1' as illustrated in Table 2.

Then, the mobile station can identify that at least one SP2 of the S-SFH SP2 transmitted within next MSI includes the changed parameters. Also, the mobile station of the idle mode can receive and decode the S-SFH SP2 per SP2 transmission period within next MSI by temporarily waking up from the idle mode.

At this time, after the changed S-SFH SP2 is received, if the SP2 is not changed again until next E-MBS MAP is transmitted, the mobile station can maintain the idle mode without waking up to receive one or more SP2 transmitted until next E-MBS MAP is transmitted after the S-SFH SP2 is changed.

Moreover, in a state that the change indicator of the S-SFH SP2 is set to '1', the base station can transfer information as to when the changed S-SFH SP2 is transmitted through the E-MBS MAP in step S704, to the mobile station. The information as to when the changed S-SFH SP2 is transmitted, i.e., the number of bits allocated to the S-SFH SP2 transmission time offset is determined depending on a value of the MSI.

For example, according to the E-MBS configuration message, if MSI size is MSI=0b00, it corresponds to two superframes. In this case, 1 bit can be allocated to the S-SFH SP2 transmission time offset field. Also, if MSI size is MSI=0b01, it corresponds to four superframes. In this case, 2 bits can be allocated to the S-SFH SP2 transmission time offset field. Also, if MSI size is MSI=0b10, it corresponds to eight superframes. In this case, 3 bits can be allocated to the S-SFH SP2 transmission time offset field. Also, if MSI size is MSI=0b11, it corresponds to sixteen superframes. In this case, 4 bits can be allocated to the S-SFH SP2 transmission time offset field. The transmission time offset can be represented by a superframe unit for an increase and decrease level based on the time when the original S-SFH SP2 is transmitted.

The mobile station that has received the information of the changed S-SFH SP2 and the transmission time offset information as to when the changed SP2 is transmitted through the E-MBS MAP can receive and decode the changed SP2 at the corresponding time (S705). Since the decoding operation of the changed SP2 has been performed, the mobile station of the idle mode can receive and decode the E-MBS MAP transmitted from the base station and receive one or more E-MBS bursts (S706).

Meanwhile, the mobile station of the connected state or the normal mode can receive the changed S-SFH SP2. However, considering that it may be difficult to receive the changed S-SFH SP2 due to a poor channel status, the procedure of transmitting E-MBS MAP, which includes the aforementioned S-SFH SP2 update indicator, as described in FIG. 7, can be applied to the mobile station. In addition, the embodiments of the present invention can be applied to the mobile station of the connected state in the same manner.

Figure 8:
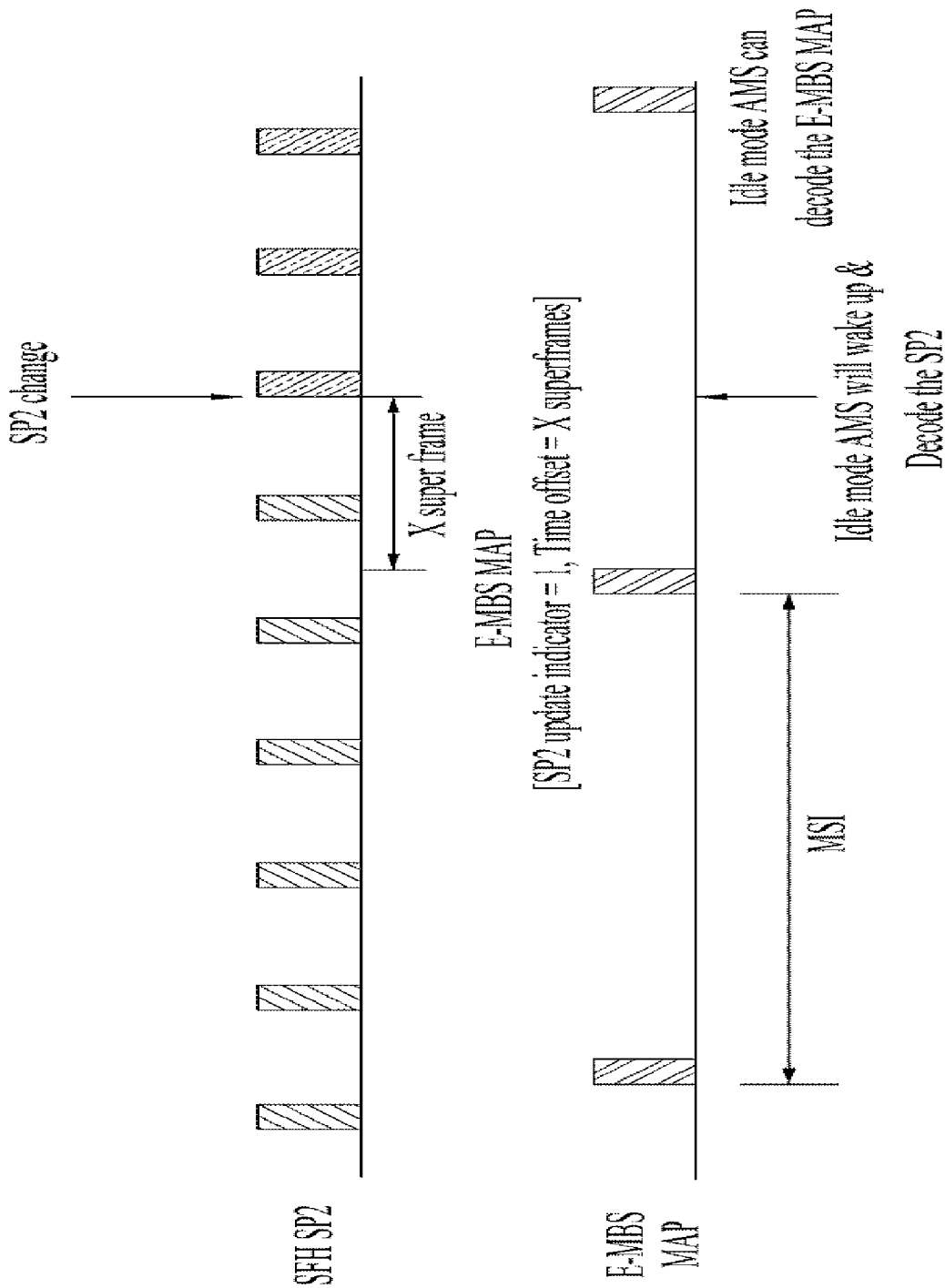
FIG. 8 is a diagram illustrating another example of a frame structure for transmitting E-MBS MAP from a base station, which uses E-MBS, to a mobile station of an idle mode in accordance with one embodiment of the present invention.

FIG. 8 is a diagram illustrating another example of a frame structure for transmitting E-MBS MAP from a base station, which uses E-MBS, to a mobile station of an idle mode in accordance with one embodiment of the present invention.

Referring to FIG. 8, if the S-SFH SP2 parameter, which will be transmitted, is changed, the base station can transmit the E-MBS MAP, which includes an indicator indicating that the S-SFH SP2 parameter is changed, at the time when the MSI, for which the changed S-SFH SP2 is transmitted, starts. In this case, the E-MBS MAP can include S-SFH SP2 transmission time offset information. The mobile station of the idle mode, which has received the E-MBS MAP, can receive and decode the changed S-SFH SP2 by waking up at the time indicated by the transmission time offset information included in the E-MBS MAP, thereby receiving the changed S-SFH SP2.

Since the mobile station has received the changed S-SFH SP2, it can obtain next E-MBS resource zone by calculating the number of all subbands based on downlink frequency partition information (DSAC, DFPC, DFPSC). And, the mobile station can decode the corresponding MAP by discovering the location of the next E-MBS MAP from the obtained E-MBS resource zone, and can receive next E-MBS burst.

2. Second Embodiment

According to another embodiment of the present invention, the base station can identify whether the S-SFH SP2 has been changed, by comparing system configuration information transmitted through P-SFH with system information transmitted through E-MBS MAP, and can receive the changed S-SFH SP2.

Figure 9:
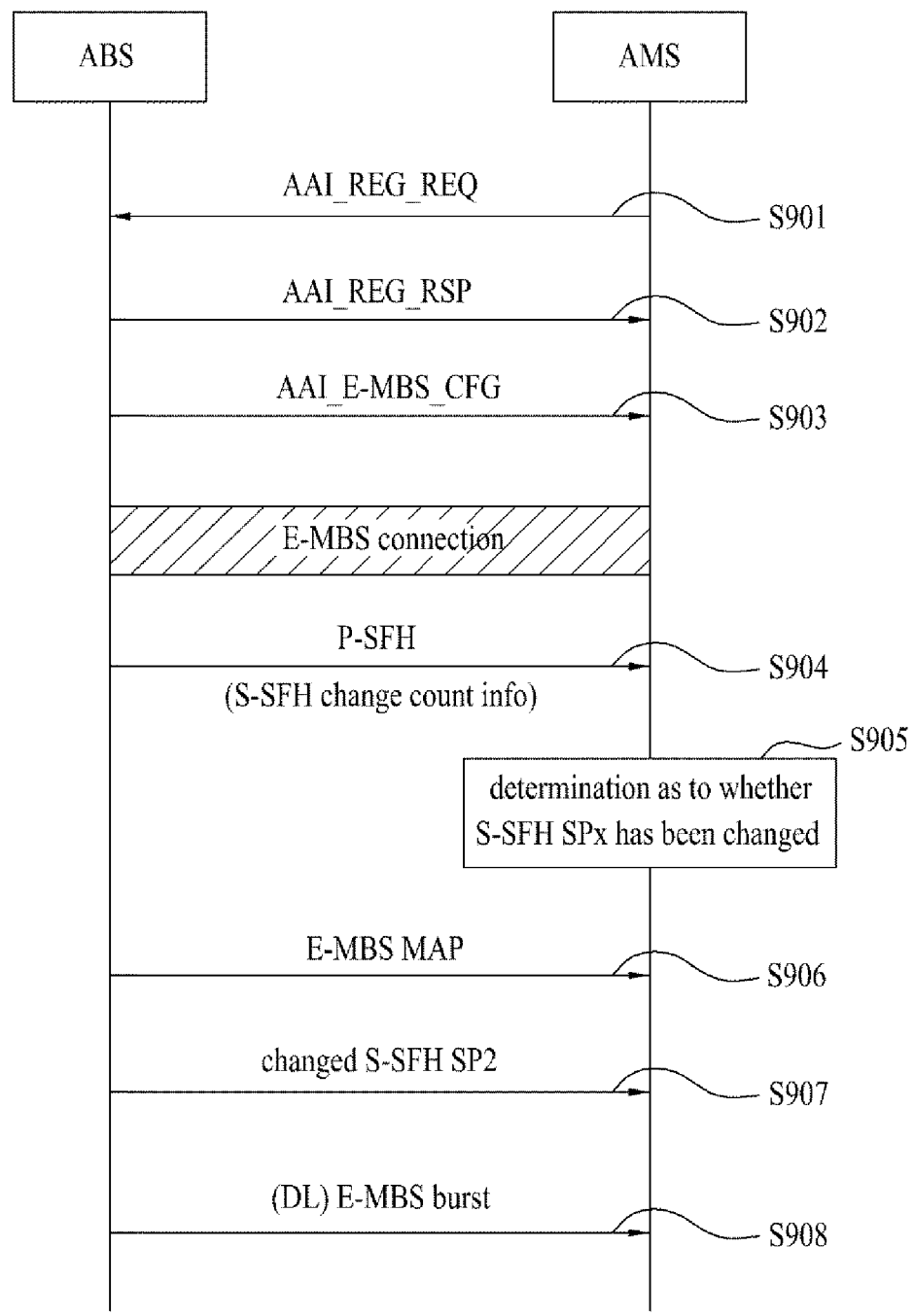
FIG. 9 is a diagram illustrating another example of a procedure of providing E-MBS from a base station, which uses the E-MBS, to a mobile station in accordance with one embodiment of the present invention.

FIG. 9 is a diagram illustrating another example of a procedure of providing E-MBS from a base station, which uses the E-MBS, to a mobile station in accordance with one embodiment of the present invention.

In FIG. 9, the base station, which corresponds to a random one included in the E-MBS zone, can support the E-MBS in accordance with a request of the mobile station. Also, it is assumed that the steps S501 to S503 for E-MBS establishment described in FIG. 5 are performed. In FIG. 9, steps S901 to S903 for E-MBS establishment correspond to the steps S501 to S503 illustrated in FIG. 5 and their description will be omitted for conciseness of the specification.

Referring to FIG. 9, the mobile station of the idle mode previously wakes up at the superframe, which includes the S-SFH SP2 transmitted just before the MSI starts, and receives the P-SFH IE transmitted through the P-SFH, thereby identifying whether the S-SFH has been changed (S904). At this time, the P-SFH IE will be described with reference to Table 5.

Table 5 illustrates an example of a P-SFH IE format according to one embodiment of the present invention.

TABLE 5

| Syntax | Size(bits) | Notes |
|---|---|---|
| P-SFH IE Format( ){ | | |
| LSB of superframe number | 4 | Part of superframe number |
| S-SFH change count | 4 | Indicates the value of S-SFH changecount associated with the S-SFHSPx IE(s) transmitted in this superframe |
| S-SFH size | 4 | The units if LRU |
| S-SFH number of repetitions | 2 | Indicate the transmission format (repetition) used for S-SFH |

TABLE 5-continued

| Syntax | Size(bits) | Notes |
| --- | --- | --- |
| S-SFH scheduling information bitmap | 3 | |
| S-SFH SP change bitmap | 3 | Indicates the change of S-SFH SPx IE(s) associated with the S-SFH change count |
| Start superframe offset where new S-SFH information is used | 2 | |
| Reserved | 3 | The reserved bits are for future extension |
| } | | |

Referring to Table 5, the P-SFH IE includes a lowest significant bit superframe number (LSB of superframe number) field that includes a number of a part of resource units of a superframe, an S-SFH change count field indicating S-SFH change count associated with an information element (IE), of each S-SFH SP, a size (S-SFH size) field indicating LRU size corresponding to the S-SFH, an S-SFH number of repetitions field that includes information of repetition transport formats used to each S-SFH SP, an S-SFH scheduling information bitmap field that includes a bitmap having information of each S-SFH SP scheduling, a start superframe offset field where superframe offset for new S-SFH information starts, and a reserved field.

The bit value included in the S-SFH change count is increased whenever a part of values excluding the most significant bit (MSB) of superframe number from the S-SFH SP1 IE is changed. If the change count indicated by the change count field included in the P-SFH IE which is continuously transmitted, is the same as that change count included in the P-SHF IE which is previously transmitted, the mobile station can decide to disregard the next S-SFH IE at the corresponding superframe, without changing parameters included in the S-SFH IE.

The S-SFH change bitmap field includes a bitmap indicating changed S-SFH SPx IE in respect of the current S-SFH change count. Likewise, if any one of a plurality of fields constituting the S-SFH SPx IE excluding the MSB of the superframe number from the S-SFH SP1 IE is changed, the bit corresponding to the corresponding S-SFH SPx IE is toggled.

Accordingly, if the mobile station is in the idle mode, it wakes up at the time when SP2 is transmitted before the MSI starts and receives the P-SFH IE illustrated in Table 5. As a result, the mobile station can determine whether the SP2 has been changed (S905). In more detail, the mobile station compares S-SFH change count information included in the received P-SFH IE (for example, the nth P-SFH IE) with S-SFH change count information included in the previous P-SFH IE (for example, the m(m≤n−1)th P-SFH IE), and if the former is the same as the latter, the mobile station determines there is no any change in the S-SFH SPs. In other words, the mobile station can determine whether there is any change in the S-SFH by comparing S-SFH change count information, which is known by the mobile station before the nth P-SFH IE is received, with updated S-SFH change count information.

If the S-SFH change count information included in the nth P-SFH IE is not the same as the S-SFH change count information included in the mth P-SFH IE, the mobile station determines there is any change in the S-SFH SPs and also determines whether the changed SP is SP2.

If the changed SP is SP2, the mobile station wakes up at the time when the changed SP2 is transmitted and receives and decodes the changed SP2 based on the S-SFH change count information and a transmission period of SP2 included in SP3 at the corresponding superframe. If the SP2 is changed, the mobile station can identify whether the changed SP2 is applied to the superframe corresponding to the MSI. If the changed SP is not SP2, the mobile station does not need to receive SP2, and can read the corresponding SP by waking up at the time when the changed SP is transmitted, or can continue to maintain the wake-up state.

Also, the mobile station performs the E-MBS procedure in accordance with system version information applied thereto. The mobile station can identify whether the SP2 is scheduled at the corresponding superframe through a scheduling bitmap included in the P-SFH. If the SP2 is not scheduled at the corresponding superframe, the mobile station can identify that scheduling information (transmission period) of the SP2 currently included therein has been changed. If SP3 that includes a transmission period only is changed, the mobile station can scan every superframe to receive the SP3. Alternatively, if the SP2 as well as the SP3 is changed, the mobile station should scan every superframe to receive the SP2.

The mobile station wakes up at the time when the S-SFH SP2 to which changed details are applied is transmitted based on the change count information of the S-SPH SP included in the P-SFH and the transmission period of the SP2, and receives the changed SP2 (S906).

The mobile station that has decoded the changed SP2 receives next E-MBS MAP (S907). At this time, an example of the transmitted E-MBS MAP includes the general E-MBS MAP described in Table 2 or the E-MBS MAP that includes the S-SFH SP2 change indicator according to one embodiment of the present invention, which is described in Table 4.

The mobile station that has performed decoding by reading the E-MBS MAP receives one or more E-MBS bursts from the base station (S908).

Figure 10:
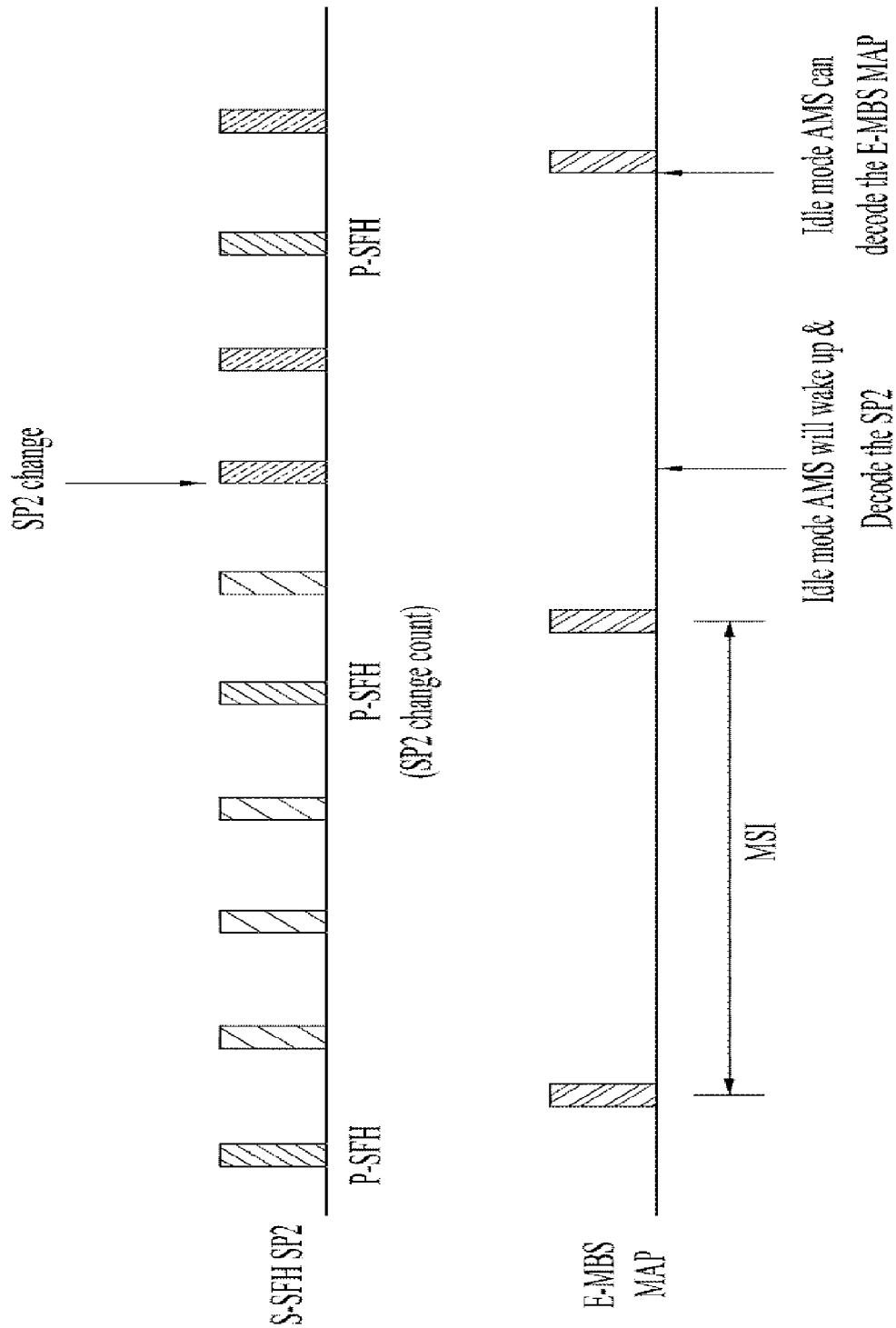
FIG. 10 is a diagram illustrating still another example of a frame structure for transmitting E-MBS MAP from a base station, which uses E-MBS, to a mobile station of an idle mode in accordance with one embodiment of the present invention.

FIG. 10 is a diagram illustrating another example of a frame structure for transmitting E-MBS MAP from a base station, which uses E-MBS, to a mobile station of an idle mode in accordance with one embodiment of the present invention.

Referring to FIG. 10, the mobile station previously wakes up at the superframe, to which SP2 is transmitted before the MSI starts, and reads the P-SFH. At if S-SFH change count information is included in the P-SFH, the mobile station can identify whether the SP2 parameter has been changed, by comparing the S-SFH change count information included in the P-SFH with the change count information included in the previous P-SFH as described in FIG. 9. If it is identified that the SP2 has been changed, the mobile station of the idle mode can receive and decode the changed SP2 by waking up at the transmission time of SP2 to which changed details are applied based on the S-SFH SP2 change count information and the SP2 transmission period acquired through the SP3.

Since the mobile station has received the changed S-SFH SP2, it can obtain next E-MBS resource zone by calculating the number of all subbands based on downlink frequency partition information (DSAC, DFPC, DFPSC). And, the mobile station can decode the corresponding MAP by discovering the location of the next E-MBS MAP from the obtained E-MBS resource zone, and can receive next E-MBS burst.

3. Third Embodiment

The base station that belongs to the E-MBS zone can transmit E-MBS MAP, which includes version information of system information applied within the current MSI, to the mobile station at a predetermined period. Accordingly, since the mobile station that has received the E-MBS MAP can know version information of system information applied to the corresponding superframe through the E-MBS MAP, it may not identify the P-SFH previously before the MSI starts.

According to another embodiment of the present invention, the base station can transmit E-MBS MAP, which includes an example of version information of system information and change count information of the changed S-SFH, to the mobile station.

Figure 11:
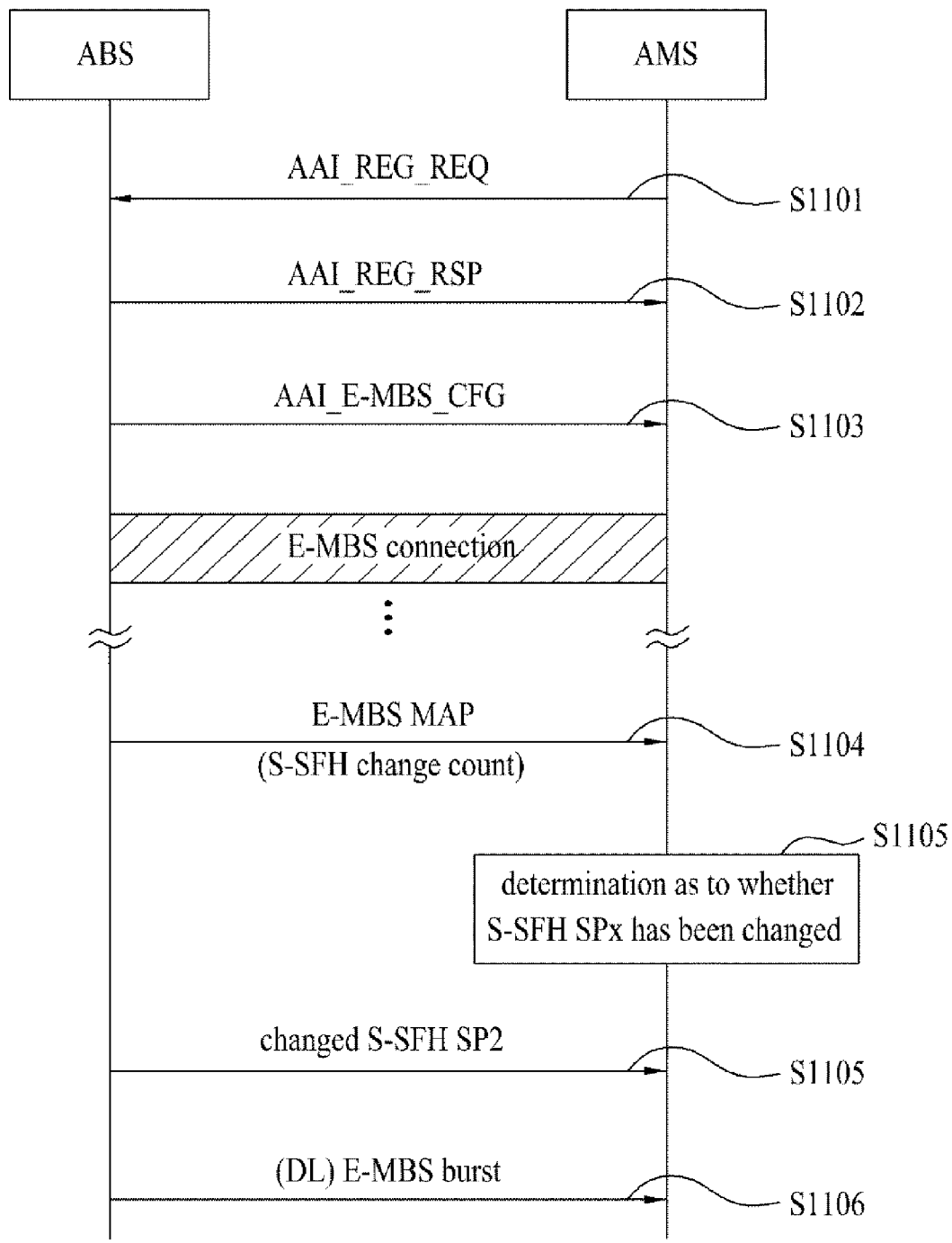
FIG. 11 is a diagram illustrating still another example of a procedure of providing E-MBS from a base station, which uses the E-MBS, to a mobile station in accordance with one embodiment of the present invention.

FIG. 11 is a diagram illustrating another example of a procedure of providing E-MBS from a base station, which uses the E-MBS, to a mobile station in accordance with one embodiment of the present invention.

In FIG. 11, the base station, which corresponds to a random one included in the E-MBS zone, can support the E-MBS in accordance with a request of the mobile station. Also, it is assumed that the steps S501 to S503 for E-MBS establishment described in FIG. 5 are performed. In FIG. 11, steps S1101 to S1103 for E-MBS establishment correspond to the steps S501 to S503 illustrated in FIG. 5 and their description will be omitted for conciseness of the specification.

Referring to FIG. 11, the base station transmits E-MBS MAP to the mobile station at a predetermined period. In this case, an example of version information of system information includes S-SFH change count information. If E-MBS connection is performed, the mobile station can receive and read the E-MBS MAP, and can identify the S-SFH change count information included in the E-MBS MAP (S1104). The E-MBS MAP configured in accordance with another embodiment of the present invention is as illustrated in Table 6.

Table 6 illustrates an example of an E-MBS MAP format according to one embodiment of the present invention.

TABLE 6

| Syntax | Size(bits) | Notes |
| --- | --- | --- |
| E-MBS-MAP( ){ | — | — |
| S-SFH change count | 4 | — |
| E-MBS-DATA_IE( ) | — | — |
| } | | |
| Psdding | variable | Padding to reach byte boundary |

The E-MBS MAP illustrated in Table 6 means one that additionally includes an S-SFH change count field in the general E-MBS MAP, wherein the S-SFH change count field includes S-SFH change count information. Since other fields have been described in Table 2, their description will be omitted. Unlike this, the S-SFH change count field may be added to the E-MBS MAP according to the embodiment of the present invention, which is described in Table 4.

The mobile station that has received the E-MBS MAP illustrated in Table 6 compares the S-SFH change count information originally known by itself with the S-SFH change count information acquired through the E-MBS MAP to identify whether the S-SFH SPx and the SP2 have been changed (S1105). In other words, in the same manner as S905 of FIG. 9, the mobile station compares the S-SFH change count information known by itself with the updated S-SFH count information, and if the former is the same as the latter, the mobile station determines there is no any change in the S-SFH SP and performs a general E-MBS procedure.

If the S-SFH change count information previously received by the mobile station is not the same as the S-SFH change count information included in the E-MBS MAP received in the step S1104, the mobile station determines there is any change in the S-SFH SPs and also determines whether the changed SP is SP2. If the changed SP is SP2, the mobile station of the idle mode wakes up at the time when the changed SP2 is transmitted, based on the S-SFH change count information and a transmission period of SP2 included in SP3 at the corresponding superframe, and receives and decodes the changed SP2. Also, if the SP2 is changed, the mobile station can identify whether the changed SP2 is applied to the superframe corresponding to the MSI.

Accordingly, the mobile station of the idle mode can receive and decode the changed SP2 by waking up at the time when the changed SP2 is transmitted.

Afterwards, the mobile station discovers the location of the next E-MBS MAP based on the downlink frequency information included in the SP2, and receives next E-MBS bursts based on the information included in the E-MBS MAP (S1107).

Figure 12:
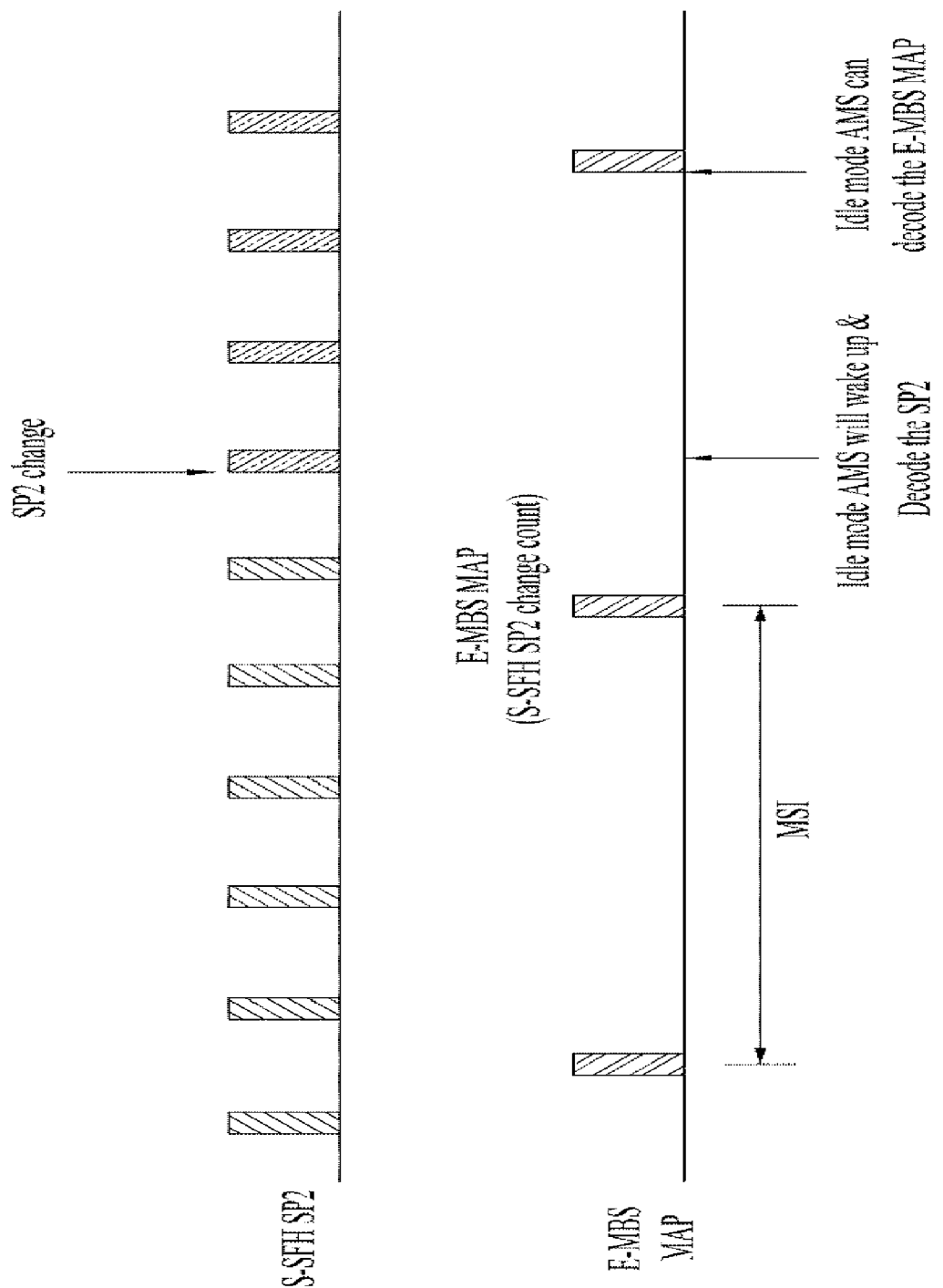
FIG. 12 is a diagram illustrating further still another example of a frame structure for transmitting E-MBS MAP from a base station, which uses E-MBS, to a mobile station of an idle mode in accordance with one embodiment of the present invention.

FIG. 12 is a diagram illustrating another example of a frame structure for transmitting E-MBS MAP from a base station, which uses E-MBS, to a mobile station of an idle mode in accordance with one embodiment of the present invention.

Referring to FIG. 12, the base station can transmit the E-MBS MAP, which includes S-SFH change count information, at the time when the MSI, for which the changed S-SFH SP2 is transmitted, starts. The mobile station of the idle mode, which has received the E-MBS MAP, determines whether the SP2 has been changed, and identifies the time when the changed SP2 is transmitted, based on the S-SFH change count information and a transmission period of SP2 acquired through SP3. The mobile station temporarily wakes up at the time when the changed SP2 is transmitted, and receives and decodes the changed SP2.

Since the mobile station has received the changed S-SFH SP2, it can obtain next E-MBS resource zone by calculating the number of all subbands based on downlink frequency partition information (DSAC, DFPC, DFPSC). And, the mobile station can decode the corresponding MAP by discovering the location of the next E-MBS MAP from the obtained E-MBS resource zone, and can receive next E-MBS burst.

The method for updating the S-SFH in accordance with the embodiments of the present invention has been described as an example of SP2 of sub-packets of the secondary super frame header.

Moreover, the embodiments of the present invention can equally or similarly applied to even the case where the parameters transmitted through P-SFH, S-SFH SP1 and SP3 as well as S-SFH SP2 are changed.

Alternatively, the method according to the embodiments of the present invention can be used as the method for indicating update of all super frame headers. For example, the S-SFH SP update indicator described in Table 4 can be replaced with an SFH update indicator. At this time, the super frame update indicator indicates that the parameter associated with at least one E-MBS among sub-packets (SP1, SP2 and SP3) of the primary super frame header and the secondary super frame header is changed. Also, if the mobile station fails to read the E-MBS zone in accordance with change of the parameters included in the super frame header and thus fails to receive E-MBS MAP and E-MBS burst, the base station can include a transmission time offset field in the E-MBS MAP, wherein the transmission time offset field indicates the time when the changed super frame header is transmitted.

Figure 13:
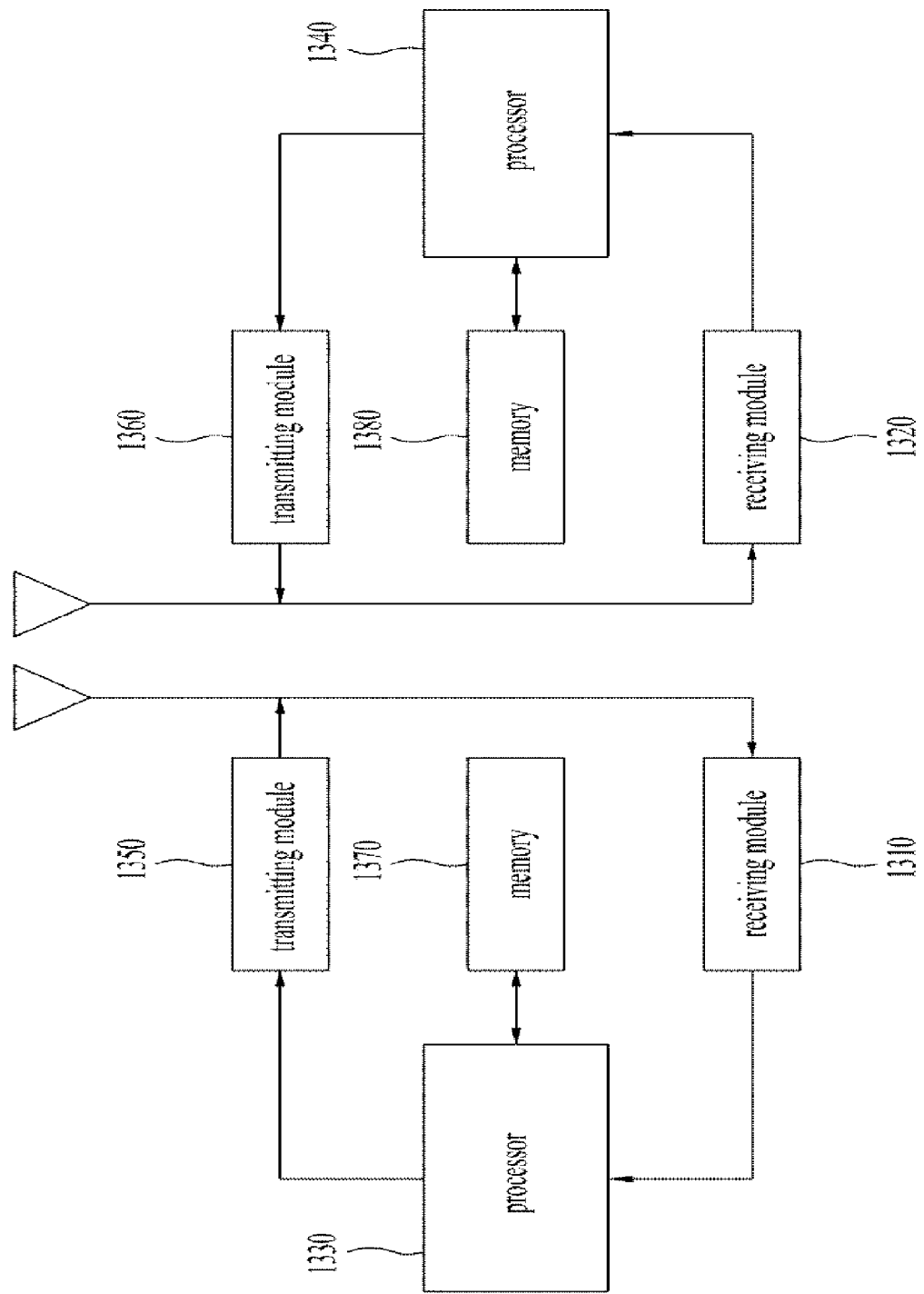
FIG. 13 is a block diagram illustrating a mobile station and a base station through which the embodiments of the present invention can be carried out.

Next, FIG. 13 is a block diagram illustrating a mobile station and a base station through which the aforementioned embodiments of the present invention can be carried out.

The mobile station is operated as a transmitter in an uplink, whereas the mobile station is operated as a receiver in a downlink. Also, the base station is operated as a receiver in the uplink, whereas the base station is operated as a transmitter in the downlink. In other words, each of the mobile station and the base station can include a transmitter and a receiver to transmit information or data.

The transmitter and the receiver can include a processor, module, and part and/or means, through which the embodiments of the present invention can be carried out. In particular, the transmitter and the receiver can include a module (means) for encoding message, a module for decoding the encoded message, and an antenna for transmitting and receiving the message.

Referring to FIG. 13, the left side illustrates a structure of the transmitter while the right side illustrates a structure of the receiver. In order to perform the aforementioned embodiments of the present invention, an example of the transmitter includes a base station and an example of the receiver includes a mobile station.

Each of the transmitter and the receiver can include an antenna, a receiving module 1310, 1320, a processor 1330, 1340, a transmitting module 1350, 1360, and a memory 1370, 1380.

The antenna includes a receiving antenna for receiving a radio signal from the outside to transfer the radio signal to the receiving module 1310, 1320, and a transmitting antenna for transmitting a signal generated by the transmitting module 1350, 1360 to the outside. If a MIMO function is supported, two or more antennas may be provided.

The receiving module 1310, 1320 performs decoding and demodulation for the radio signal received from the outside through the antenna to recover original data and then transfer the recovered data to the processor 1330, 1340. Also, the receiving module and the antenna may be represented by a receiver for receiving a radio signal instead of being provided separately as illustrated in FIG. 13.

The processor 1330, 1340 generally controls the whole operation of the transmitter or the receiver. In particular, the processor can perform a controller function for performing the aforementioned embodiments of the present invention, a medium access control (MAC) frame variable control function according to service characteristics and radio wave condition, a handover function, an authentication and encryption function, etc.

The transmitting module 1350, 1360 performs predetermined coding and modulation for data, which are scheduled from the processor 1330, 1340 and then transmitted to the outside, and then transfers the coded and modulated data to the antenna. Also, the transmitting module and the antenna may be represented by a transmitter for transmitting a radio signal instead of being provided separately as illustrated in FIG. 13.

The memory 1370, 1380 may store a program for processing and control of the processor 1330, 1340, or may perform a function for temporarily storing input/output data (in case of the mobile station, uplink (UL) grant allocated from the base station, system information, station identifier (STID), flow identifier (FID), action time, etc.). Also, the memory 1370, 1380 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The processor 1330 of the transmitter performs the whole control operation of the transmitter. Also, the processor 1330 can perform the control operation required to provide E-MBS service to the receiver. Moreover, the processor 1330 can perform the control operation so that the mobile station of the idle mode can receive E-MBS burst in accordance with the embodiments of the present invention described in FIG. 7 to FIG. 12.

The processor 1340 of the receiver also performs the whole control operation of the receiver. For example, when the E-MBS is used in accordance with the embodiments of the present invention, the processor 1340 performs the control operation of the state mode so that the receiver in the idle mode can wake up to receive a signal. Likewise, the processor 1340 performs the operation according to the embodiments of the present invention described in FIG. 7 to FIG. 12.

The mobile station used in the embodiments of the present invention can include a low power radio frequency (RF)/intermediate frequency (IF) module. Also, the mobile station can include a means, module or part for performing controller function, medium access control (MAC) frame variable control function according to service characteristics and radio wave condition, handover function, authentication and encryption function, packet modulation and demodulation function for data transmission, quick packet channel coding function, and real-time modem control function, thereby performing the aforementioned embodiments of the present invention.

The base station can transmit data received from an upper layer to the mobile station by wireless or wire. The base station can include a low power RF/IF module. Also, the base station can include a means, module or part for performing controller function, orthogonal frequency division multiple access (OFDMA) packet scheduling, time division duplex (TDD) packet scheduling and channel multiplexing function, medium access control (MAC) frame variable control function according to service characteristics and radio wave condition, handover function, authentication and encryption function, packet modulation and demodulation function for data transmission, quick packet channel coding function, and real-time modem control function, thereby performing the aforementioned embodiments of the present invention.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to various wireless access systems. Examples of various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

The invention claimed is:
1. A method for receiving multicast and broadcast service (MBS) data from a base station at a mobile station, the method comprising:
receiving a sub-packet of a secondary-super frame header (S-SFH) from the base station in accordance with a predetermined period, wherein the sub-packet com- prises information associated with initial network entry and network discovery; and receiving a first MBS MAP from the base station, wherein the first MBS MAP comprises an S-SFH sub-packet update indicator indicating whether a changed S-SFH sub-packet will be transmitted, wherein the S-SFH sub-packet update indicator indicates whether the changed S-SFH sub-packet will be transmitted within an MBS scheduling interval (MSI) for which the first MBS MAP is transmitted.

2. The method of claim 1, wherein, if the S-SFH sub-packet update indicator indicates change of the sub-packet, the first MBS MAP comprises a transmission time offset field indicating the time when the changed S-SFH sub-packet is transmitted.

3. The method of claim 2, wherein the transmission time offset field comprises information of the number of superframes increased or decreased based on the time when a sub-packet prior to the changed S-SFH sub-packet is transmitted in a radio frame structure.

4. The method of claim 2, wherein the number of bits of the transmission time offset field is determined depending on the MSI.

5. The method of claim 2, if the mobile station is in a mode for saving power, further comprising receiving the changed S-SFH sub-packet by waking up at the time when the changed S-SFH sub-packet is transmitted in accordance with the transmission time offset information, wherein the mode comprises an idle mode and a sleep mode.

6. The method of claim 5, further comprising:
obtaining an MBS resource zone based on information of downlink subband and frequency partition included in the changed S-SFH sub-packet; and
receiving a second MBS MAP and MBS burst from the obtained MBS resource zone.

7. The method of claim 6, wherein the information of downlink subband and frequency partition comprises at least one of downlink subband allocation count (DSAC) information, downlink frequency partition configuration (DFPC) information, and downlink frequency partition subband count (DFPSC) information.

8. The method of claim 1, wherein the S-SFH includes a first S-SFH sub-packet, a second S-SFH sub-packet and a third S-SFH sub-packet, which are respectively transmitted with their independent transmission periods at different times, and wherein the sub-packet including the information associated with initial network entry and network discovery is the second sub-packet associated with the MBS.

9. A method for transmitting multicast and broadcast service (MBS) data at a base station, the method comprising:
transmitting a sub-packet of a secondary-super frame header (S-SFH) to a mobile station in accordance with a predetermined period, wherein the sub-packet comprises information associated with initial network entry and network; and
transmitting a first MBS MAP to the mobile station, wherein the first MBS MAP comprises an S-SFH sub-packet update indicator indicating whether a changed S-SFH sub-packet will be transmitted,
wherein the S-SFH sub-packet update indicator indicates whether the changed S-SFH sub-packet will be transmitted within an MBS scheduling interval (MSI) for which the first MBS MAP is transmitted.

10. The method of claim 9, wherein, if the S-SFH sub-packet update indicator indicates change of the sub-packet, the first MBS MAP comprises a transmission time offset field indicating the time when the changed S-SFH sub-packet is transmitted.

11. The method of claim 10, wherein the transmission time offset field comprises information of the number of superframes increased or decreased based on the time when a sub-packet prior to the changed S-SFH sub-packet is transmitted in a radio frame structure.

12. The method of claim 10, wherein the number of bits of the transmission time offset field is determined depending on the MSI.

13. The method of claim 10, further comprising:
transmitting the changed S-SFH sub-packet to the mobile station; and
transmitting a second MBS MAP and MBS burst to the mobile station.

14. The method of claim 9, wherein the sub-packet further comprises information of downlink subband and frequency partition, wherein the information of downlink subband and frequency partition comprises at least one of downlink subband allocation count (DSAC) information, downlink frequency partition configuration (DFPC) information, and downlink frequency partition subband count (DFPSC) information.

15. A mobile station for receiving multicast and broadcast service (MBS) data, the mobile station comprising:
a receiving module for receiving a radio signal; and
a processor for controlling an operation of the mobile station,
wherein the receiving module receives s sub-packet of a secondary-super frame header (S-SFH) and a first MBS MAP including an S-SFH sub-packet update indicator form a base station in accordance with a predetermined period,
wherein the sub-packet comprises information associated with initial network entry and network discovery,
wherein the S-SFH sub-packet update indicator indicates whether a changed S-SFH sub-packet will be transmitted within an MBS scheduling interval (MSI) for which the first MBS MAP is transmitted, wherein the processor controls the mobile station of a mode for saving power so that the mobile station wakes up at the time when the changed S-SFH sub-packet is transmitted in accordance with the S-SFH sub-packet update indicator and receives the changed S-SFH sub-packet, and
wherein the mode comprises an idle mode and a sleep mode.

16. A base station for transmitting multicast and broadcast service (MBS) data, the base station comprising:
a transmitting module for transmitting a radio signal; and
a processor generating a sub-packet of a secondary-super frame header (S-SFH) and an MBS MAP including an S-SFH sub-packet update indicator indicating whether a changed S-SFH sub-packet will be transmitted within an MBS scheduling interval (MSI) for which the MBS MAP is transmitted, wherein the sub-packet includes information associated with initial network entry and network discovery,
wherein the processor transmit the sub-packet and the MBS MAP to a mobile station through the transmitting module in accordance with a predetermined period.

* * * * *